(12) United States Patent
Sudhakaran et al.

(10) Patent No.: US 10,015,234 B2
(45) Date of Patent: Jul. 3, 2018

(54) METHOD AND SYSTEM FOR PROVIDING INFORMATION VIA AN INTELLIGENT USER INTERFACE

(71) Applicant: SONY CORPORATION, Tokyo (JP)

(72) Inventors: Nisanth Sudhakaran, Bangalore (IN); Raghunandan Dhongadi, Bangalore (IN)

(73) Assignee: SONY CORPORATION, Tokyo (JP)

( * ) Notice: Subject to any disclaimer, the term of this patent is extended or adjusted under 35 U.S.C. 154(b) by 634 days.

(21) Appl. No.: 14/457,280

(22) Filed: Aug. 12, 2014

(65) Prior Publication Data
US 2016/0048759 A1 Feb. 18, 2016

(51) Int. Cl.
G06F 17/00 (2006.01)
H04L 29/08 (2006.01)

(52) U.S. Cl.
CPC .................. H04L 67/10 (2013.01)

(58) Field of Classification Search
CPC ............................... G06F 17/30654
USPC ....................................... 706/15, 45
See application file for complete search history.

(56) References Cited

U.S. PATENT DOCUMENTS

| | | | |
|---|---|---|---|
| 8,670,979 B2 | 3/2014 | Gruber et al. | |
| 9,098,492 B2 * | 8/2015 | Tunstall-Pedoe | G06F 17/30654 |
| 9,110,882 B2 * | 8/2015 | Overell | G06F 17/278 |
| 9,536,049 B2 * | 1/2017 | Brown | G06F 19/345 |
| 2003/0001846 A1 | 1/2003 | Davis et al. | |
| 2003/0167167 A1 | 9/2003 | Gong | |
| 2004/0162724 A1 | 8/2004 | Hill et al. | |
| 2006/0228689 A1 | 10/2006 | Rajaram | |
| 2012/0016678 A1 | 1/2012 | Gruber et al. | |
| 2013/0288219 A1 * | 10/2013 | Dheap | G09B 7/12 434/350 |
| 2015/0012464 A1 * | 1/2015 | Gilbert | G06N 5/02 706/11 |

FOREIGN PATENT DOCUMENTS

| | | |
|---|---|---|
| CN | 103190115 A | 7/2013 |
| CN | 103226949 A | 7/2013 |

(Continued)

OTHER PUBLICATIONS

"Apple Launches iPhone 4S, iOS 5 & iCloud", ("http://www.apple.com/pr/library/2011/10/04Apple-Launches-iPhone-4S-iOS-5-iCloud.html"), dated Oct. 4, 2011, Cupertino, CA.

(Continued)

*Primary Examiner* — David R Vincent
(74) *Attorney, Agent, or Firm* — Chip Law Group

(57) ABSTRACT

Various aspects of a method and system for providing information via an intelligent user interface are disclosed herein. In an embodiment, in response to the receipt of a request from an electronic device, the method includes determination of a first information response that may correspond to a first functional service. A set of second information responses that corresponds to a set of second functional services may be determined based on the first information response. Each of the determined set of second information responses is associated with a corresponding weight. One or more of the determined set of second information responses are selected based on the corresponding weight. The second information responses are value-added responses.

26 Claims, 12 Drawing Sheets

(56) References Cited

FOREIGN PATENT DOCUMENTS

EP 2575128 A3 8/2013
WO 2013/173504 A1 11/2013

OTHER PUBLICATIONS

CES 2014: Samsung and LG showcase their vision of 'smart' homes, ("http://gadgets.ndtv.com/others/news/ces-2014-samsung-and-lg-showcase-their-vision-of-smart-homes-469844"), Agence France-Presse, dated Jan. 12, 2014.
Office Action for CN Patent Application No. 201510484717.2, dated Feb. 13, 2018, 08 pages of Office Action and 21 pages of English Translation.

* cited by examiner

METHOD AND SYSTEM FOR PROVIDING INFORMATION VIA AN INTELLIGENT USER INTERFACE

FIELD

Various embodiments of the disclosure relate to providing information. More specifically, various embodiments of the disclosure relate to providing information via an intelligent user interface.

BACKGROUND

With the advent of digital convergence, it has become possible to facilitate communication between various devices that support different computing and information technologies. Such technologies may be related to multimedia content, communication networks, voice services, telephony services, data services, and/or location-based services. Such communication between the various devices may be based on shared resources and a synergistic interaction with each other.

In certain scenarios, such a digital convergence may facilitate a typical two-party command-response interaction between the various devices communicatively coupled with each other. In such a command-response interaction, a first party, such as a client, a slave, or an initiator, may initiate an interaction by issuance of a command in response to an input provided by a user. A second party, such as a server, a master, or a responder, may complete the interaction by providing an appropriate response to the issued command. However, in such scenarios, the interaction may be limited to a response that typically corresponds to the same domain as that of the issued command. Such an interaction may sound robotic, as it fails to mimic intelligent human-like responses from other domains. Consequently, such an interaction may not enable the various devices to eloquently converse with the user.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A method and a system for providing information via an intelligent user interface substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
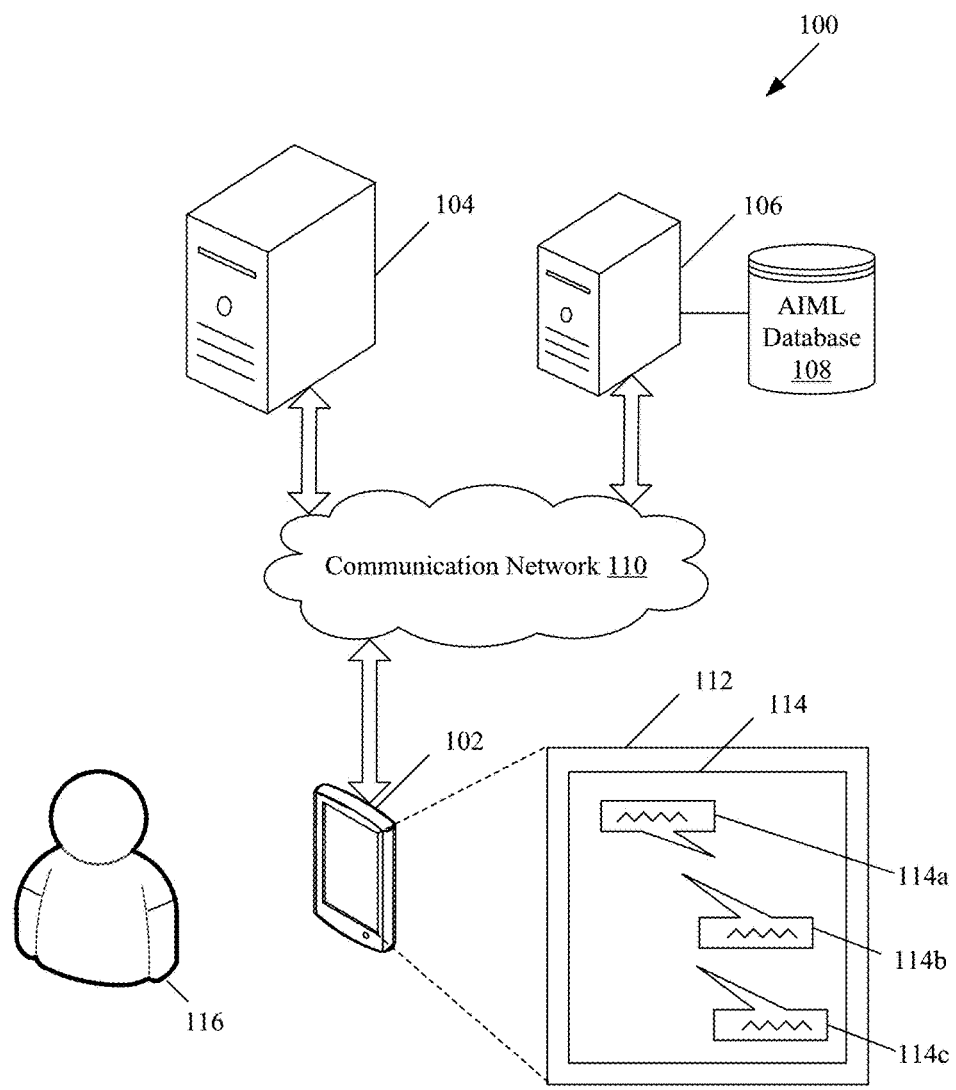
FIG. 1 is a block diagram illustrating a network environment for providing information, in accordance with an embodiment of the disclosure.

The following described implementations may be found in various methods and systems for providing information via an intelligent user interface. Exemplary aspects of the disclosure may comprise a method that may determine a first information response that may correspond to a first functional service. The first information response may be determined based on a request received from an electronic device. A set of second information responses that may correspond to a set of second functional services may be determined, based on the first information response. Each of the determined set of second information responses may be associated with a corresponding weight. One or more of the determined set of second information responses may be selected based on the corresponding weight.

In an embodiment, the first functional service and the set of second functional services may correspond to one or more of an Internet Protocol (IP) telephony system, a space-based satellite navigation system, a social network, a wireless connection system, an address book system, an instant messaging system, a weather forecasting system, a camera-based system, a timer system, a user profile information system, an image processing system, a calendaring system, a video playback system, and/or a sensor-based system.

In an embodiment, the method may comprise selection of the first functional service based on a first command. The first command may be issued based on a response template. The response template may correspond to the request received from the electronic device. In an embodiment, the response template may be based on an artificial intelligence markup language (AIML). In an embodiment, the method may comprise issuance of a second command based on the determined first information response. Such a second command may be issued by a first sub-system that may provide the first functional service. The set of second functional services may be selected, based on the issued second command. The set of second functional services may be provided by a set of second sub-systems. In an embodiment, each sub-system of the set of second sub-systems may be associated with an expert sub-system related to one of: the first functional service or the set of second functional services.

In an embodiment, the method may comprise generation of the weight associated with each of the set of second information responses based on a weight-generating function of a weight master. In an embodiment, the method may comprise modification of the generated weight associated with each of the set of second information responses, based on one or both of: historical data of usage pattern and/or historical data of events. The historical data of usage patterns and the historical data of events may be related to each of the determined set of second information responses.

In an embodiment, the method may comprise communication of the determined first information response and the selected one or more second information responses to the electronic device. In an embodiment, the selection of one or more of the determined set of second information responses may be based on a determination of the corresponding weights higher than a threshold value. In an embodiment, the method may comprise notification to other sub-systems of the set of second sub-systems about the selection of one or more of the set of second information responses generated by one of the set of second sub-systems.

Another exemplary aspect of the disclosure may comprise a method for providing information in an electronic device. The method may comprise communication of a request to a server. The request may be indicative of a user input provided via an intelligent user interface (UI) of the electronic device. A first information response and one or more second information responses may be received in response to the communicated request. The first information response may correspond to a first functional service. The one or more second information responses may correspond to a set of second functional services. The received first information response and the received one or more second information responses may be outputted via the intelligent UI of the electronic device.

In an embodiment, the first functional service and the set of second functional services may correspond to one or more of an Internet Protocol (IP) telephony system, a space-based satellite navigation system, a social network, a wireless connection system, an address book system, an instant messaging system, a weather forecasting system, a camera-based system, a timer system, a user profile information system, an image processing system, a calendaring system, a video playback system, and/or a sensor-based system.

In an embodiment, the method may comprise determination of a response template based on the user input. The response template may be based on an AIML. In an embodiment, the output of the received responses may be one or both of an audio output and/or a visual output. The audio output may be generated by one or more speakers. The visual output may be presented on a display screen of the electronic device.

FIG. 1 is a block diagram illustrating a network environment 100 for providing information, in accordance with an embodiment of the disclosure. With reference to FIG. 1, there is shown an electronic device 102, a server 104, an Artificial Intelligence Markup Language (AIML) server 106, an AIML database 108, a communication network 110, a display screen 112, an intelligent UI 114, and one or more users, such as a user 116.

The electronic device 102 may be communicatively coupled to the server 104 and the AIML server 106, via the communication network 110. The AIML server 106 may be communicatively coupled to the AIML database 108. The electronic device 102 may include the display screen 112 that may render the intelligent UI 114. The electronic device 102 may be associated with the user 116. The intelligent UI 114 may include a first region 114a, adapted to present user input. The intelligent UI 114 may further include a second region 114b, and a third region 114c. The second region 114b may be adapted to present a message that may correspond to a first information response. The third region 114c may be adapted to present one or more messages that may correspond to one or more second information responses, received from the server 104.

The electronic device 102 may comprise suitable logic, circuitry, interfaces, and/or code that may be operable to communicate a request to the server 104. The request may be indicative of input received from the user 116, via the intelligent UI 114. The electronic device 102 may be further operable to receive a first information response and one or more second information responses, in reply to the communicated request. The electronic device 102 may be communicatively coupled with a first sub-system and a set of second sub-systems. The first sub-system may provide a first functional service, and the set of second sub-systems may provide a set of second functional services. Examples of the electronic device 102 may include, but are not limited to, a smartphone, a tablet computer, a laptop, a television, an Internet Protocol Television (IPTV), and/or a Personal Digital Assistant (PDA) device.

The server 104 may comprise suitable logic, circuitry, interfaces, and/or code that may be operable to receive requests from one or more subscribed devices, such as the electronic device 102. The server 104 may be operable to determine the first information response and one or more second information responses, in reply to the request received from the electronic device 102. The server 104 may be implemented using several technologies that are well known to those skilled in the art. Examples of the server 104 may include, but are not limited to, Apache™ HTTP Server, Microsoft® Internet Information Services (IIS), IBM® Application Server, and/or Sun Java™ System Web Server.

The AIML server 106 may comprise suitable logic, circuitry, interfaces, and/or code that may be operable to execute an AIML interpreter. In an embodiment, the AIML interpreter may be operable to locate a response template within the AIML database 108. In an embodiment, the AIML interpreter may be operable to determine and subsequently generate a response template, based on the user input received via the intelligent UI 114. In an embodiment, the AIML server 106 may be further operable to communicate the generated response template to the inference engine unit in the server 104, via the communication network 110. The AIML interpreter may be further operable to identify and resolve language ambiguities by use of technologies known in the art. The AIML interpreter may be operable to implement natural language processing of speech and/or text. Such natural language processing may be performed before the response template is communicated to the inference engine unit in the server 104. In an embodiment, the electronic device 102 may include the AIML interpreter of the AIML server 106. In an embodiment, the server 104 may include the AIML interpreter of the AIML server 106. The AIML server 106 may be implemented using several technologies that are well known to those skilled in the art.

The communication network 110 may include a medium through which the electronic device 102 may communicate with another electronic device (not shown), and one or more servers, such as the server 104 and the AIML server 106. Examples of the communication network 110 may include, but are not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN). Various devices in the network environment 100 may be operable to connect to the communication network 110, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

The display screen 112 may comprise suitable logic, circuitry, interfaces, and/or code that may be operable to render the intelligent UI 114 that may receive input from the user 116. Such input may be received from the user 116, via a virtual keypad, a stylus, a touch-based input, and/or a gesture. The display screen 112 may be further operable to present the received first information response and the received one or more second information responses, via the intelligent UI 114. In an embodiment, the intelligent UI 114 may be an intelligent human-machine interface (HMI). The display screen 112 may be further operable to render one or more features and/or applications of the electronic device 102. The display screen 112 may be realized through several known technologies such as but not limited to, Liquid Crystal Display (LCD) display, Light Emitting Diode (LED) display, and/or Organic LED (OLED) display technology In operation, the electronic device 102 may be operable to communicate a request to the server 104. The request may be indicative of input that may be provided by the user 116, via the intelligent UI 114. In an embodiment, the user input may be presented in a bubble format that may be shown on the intelligent UI 114 rendered on the display screen 112 of the electronic device 102. In an embodiment, the user input may be a voice-based command generated by the user 116.

In an embodiment, the request may be a response template that may be determined by the electronic device 102, based on the input received from the user 116. In an embodiment, the electronic device 102 may be operable to receive the response template from the AIML server 106, via the communication network 110. In an embodiment, the response template may be an AIML-based file structure. The electronic device 102 may be operable to communicate the response template to the server 104, via the communication network 110.

In an embodiment, the server 104 may be operable to receive the response template, which may be communicated by the electronic device 102. Based on the received response template, the server 104 may be operable to determine the first information response that may correspond to the first functional service. The server 104 may be further operable to determine the set of second information responses, based on the determined first information response. In an embodiment, each of the determined set of second information responses may correspond to the set of second functional services that differ from the first functional service. In an embodiment, one or more of the determined set of second information responses may correspond to the set of second functional services and/or first functional service. In an embodiment, the second information responses communicated to the electronic device 102 may be value-added responses related to the different set of second functional services. In an embodiment, the set of second functional services may correspond to different domain areas, such as a messaging service, a location based service via Global Positioning System (GPS), and/or an image processing service. In an embodiment, one of the set of second functional services may correspond to user profile information of the user 116 that may include credit card information, personal details (such as birth date, or wedding anniversary), professional details, and other user-related information.

In an embodiment, each second information response of the set of second information responses may be associated with a corresponding weight that may be generated by a weight-generating function. The weight-generating function may be implemented in the server 104. In an embodiment, the server 104 may be operable to modify each of the generated weights associated with each second information response of the set of second information responses. Such a modification may be based on learned data retrieved from a knowledge base. Such learned data may be based on historical data of usage pattern, and/or historical data of events related to each of the determined set of second information responses.

In an embodiment, the server 104 may be operable to generate weights, associated with one or more of the set of second information responses. In an embodiment, the server 104 may be operable to select one or more second information responses from the set of second information responses based on the associated weights. In an embodiment, the server 104 may be operable to determine weights that are higher than a threshold value. In an embodiment, the server 104 may be operable to determine maximum value of weight associated with one or more of the set of second information responses. In another embodiment, the server 104 may determine the maximum value corresponding to weights associated with two second information responses. In an embodiment, the server 104 may be operable to communicate the determined first information response and the selected one or more second information responses to the electronic device 102. In an embodiment, the server 104 may be operable to notify other sub-systems of the set of second sub-systems, regarding the selected one or more of the set of second information responses generated by one of the set of second sub-systems.

The electronic device 102 may be operable to receive the first information response that may correspond to the first functional service. The electronic device 102 may be further operable to receive one or more second information responses that may correspond to the set of second functional services in response to the communicated request. The electronic device 102 may be operable to output the received first information response and the received one or more second information responses, via the intelligent UI 114. The received responses may be rendered on the display screen 112 of the electronic device 102. The received one or more second information responses may be intelligent responses and/or value-added responses that may facilitate the electronic device 102 to eloquently converse with the user 116.

In an embodiment, the electronic device 102 may be operable to output the received first information response and the received one or more second information responses as a visual output. In an embodiment, the visual output may be presented via the intelligent UI 114. The visual output may be rendered on the display screen 112 of the electronic device 102. In an embodiment, the visual output may be presented in a bubble format that may be shown on the intelligent UI 114. Notwithstanding, the visual output may be presented in any suitable format without limiting the scope of the disclosure. In an embodiment, the electronic device 102 may be operable to output the received first information response and the received one or more second information responses as audio output. In an embodiment, the audio output may be generated by one or more speakers (not shown) of the electronic device 102. In an embodiment, the audio output may be realized, based on text-to-speech conversion techniques of the visual output presented on the display screen 112 of the electronic device 102. In an embodiment, the audio output may be realized directly without the requirement to present the visual output on the intelligent UI 114. In an embodiment, the functionalities of the server 104, the AIML server 106, and the AIML database 108 may be implemented in the electronic device 102, without departing from the scope of the disclosure.

Figure 2:
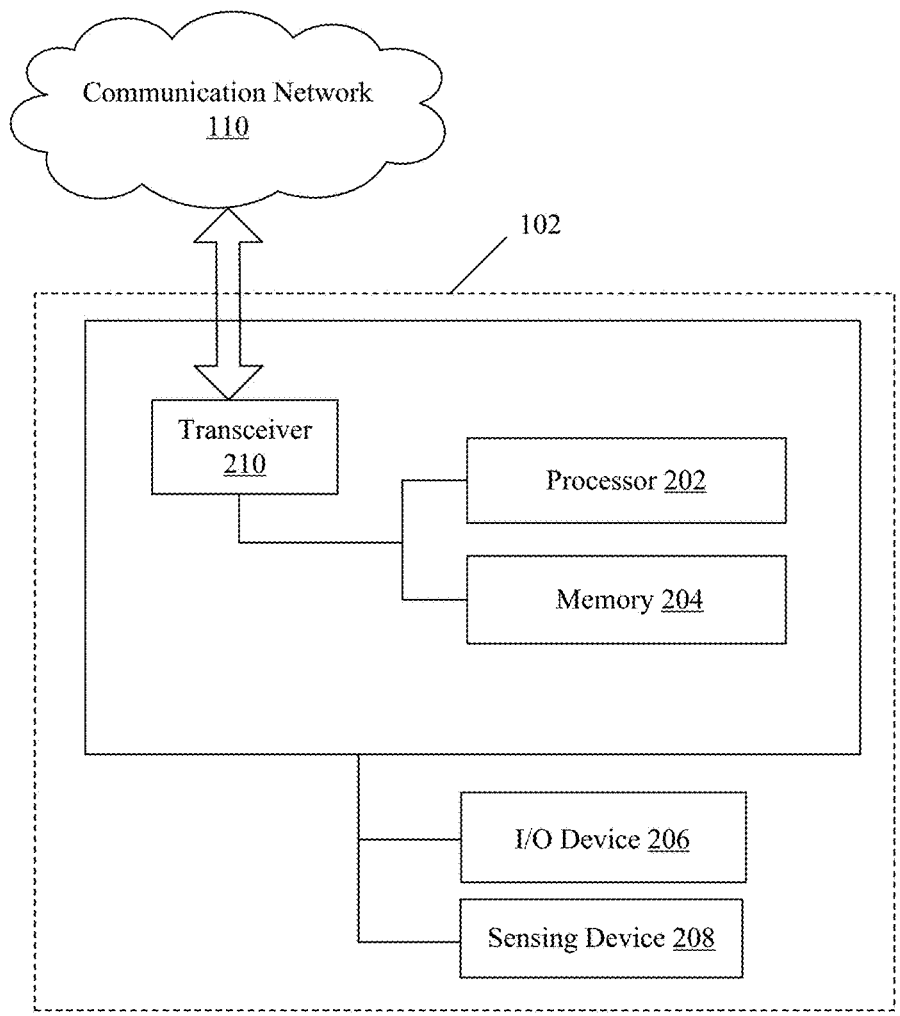
FIG. 2 is a block diagram illustrating an exemplary electronic device, in accordance with an embodiment of the disclosure.

FIG. 2 is a block diagram illustrating an exemplary electronic device, in accordance with an embodiment of the disclosure. FIG. 2 is explained in conjunction with elements from FIG. 1. With reference to FIG. 2, there is shown the electronic device 102. The electronic device 102 may comprise one or more processors, such as a processor 202, a memory 204, one or more input/output (I/O) devices, such as an I/O device 206, one or more sensing devices, such as a sensing device 208, and a transceiver 210. The processor 202 may be communicatively coupled to the memory 204, the I/O device 206, the sensing device 208, and the transceiver 210. The transceiver 210 may be operable to communicate with the one or more servers, such as the server 104 and the AIML server 106, via the communication network 110.

The processor 202 may comprise suitable logic, circuitry, interfaces, and/or code that may be operable to execute a set of instructions stored in the memory 204. The processor 202 may be implemented based on a number of processor technologies known in the art. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processors.

The memory 204 may comprise suitable logic, circuitry, and/or interfaces that may be operable to store a machine code and/or a computer program with at least one code section executable by the processor 202. The memory 204 may further be operable to store information from one or more user profiles (such as user profile information of the user 116), one or more text-to-speech conversion algorithms, one or more speech generation algorithms, and/or other data. The memory 204 may further be operable to store operating systems, such as Android™, and associated applications. In an embodiment, the memory 204 may further be operable to store an AIML interpreter. Examples of implementation of the memory 204 may include, but are not limited to, Random Access Memory (RAM), Read Only Memory (ROM), Hard Disk Drive (HDD), and/or a Secure Digital (SD) card.

The I/O device 206 may comprise suitable logic, circuitry, interfaces, and/or code that may be operable to receive an input from the user 116. The I/O device 206 may be further operable to provide an output to the user 116. The I/O device 206 may comprise various input and output devices that may be operable to communicate with the processor 202. Examples of the input devices may include, but are not limited to, a touch screen, a keyboard, a mouse, a joystick, a microphone, a camera, a motion sensor, a light sensor, and/or a docking station. Examples of the output devices may include, but are not limited to, the display screen 112, and/or a speaker.

The sensing device 208 may comprise suitable logic, circuitry, and/or interfaces that may be operable to store a machine code and/or a computer program with at least one code section executable by the processor 202. The sensing device 208 may comprise one or more sensors to confirm recognition, identification, and/or verification of the user 116. The one or more sensors may further include a microphone to detect a voice pattern of the user 116. The one or more sensors may comprise capacitive touch sensors to detect one or more touch-based input actions received from the user 116, via the intelligent UI 114.

The transceiver 210 may comprise suitable logic, circuitry, interfaces, and/or code that may be operable to communicate with one or more servers, such as the server 104 and the AIML server 106, via the communication network 110. The transceiver 210 may implement known technologies to support wired or wireless communication of the electronic device 102 with the communication network 110. The transceiver 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer. The transceiver 210 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

In operation, the processor 202 may be operable to receive input from the user 116, associated with the electronic device 102. The input may be received from the user 116, via the intelligent UI 114 rendered on the display screen 112 of the electronic device 102. In an embodiment, the I/O device 206 may be operable to receive an alphanumeric input or a non-alphanumeric input from the user 116. For example, a physical or virtual keyboard may receive the alphanumeric input, such as a query, from the user 116. Further, a microphone may be operable to receive the non-alphanumeric input, such as a voice-based input, from the user 116. In an embodiment, the sensing device 208 may be configured to receive a touch-based input, a touch-less input and/or a voice-based input, from the user 116. In an embodiment, the sensing device 208 may verify and authenticate the user 116 based on various known biometric algorithms. Examples of such biometric algorithms may include, but are not limited to, algorithms for face recognition, voice recognition, retina recognition, blood pressure check, thermograms, and/or iris recognition.

In an embodiment, the processor 202 may be operable to determine a response template, based on the input received from the user 116. The response template may be generated by the AIML interpreter stored in the memory 204. In an embodiment, the processor 202 may be operable to communicate a command to the AIML server 106, via the transceiver 210 and the communication network 110. Based on the command, the processor 202 may receive a response template from the AIML server 106, via the communication network 110. In an embodiment, the response template may be an AIML-based file structure. The processor 202 may be operable to communicate the response template to the server 104, via the communication network 110.

In an embodiment, the transceiver 210 may be operable to receive the first information response and one or more second information responses from the server 104, based on the communicated response template. In an embodiment, the first information response may correspond to the first functional service. In an embodiment, the one or more second information responses may correspond to the first functional service or the set of second functional services. In an embodiment, the transceiver 210 may communicate the received first information response and the one or more second information responses to the processor 202.

In an embodiment, the processor 202 may be operable to output the received first information response and the received one or more second information responses, via the intelligent UI 114 rendered on the display screen 112 of the electronic device 102. The output of the received first information response and the one or more second information responses may be a visual output presented, via the intelligent UI 114, on the display screen 112 of the electronic device 102. In an embodiment, the processor 202 may be further operable to output the received first information response and the one or more second information responses as audio output. The audio output may be generated by the I/O device 206, such as one or more speakers (not shown) of the electronic device 102.

In an embodiment, the processor 202 may be operable to access the memory 204 for one or more text-to-speech conversion algorithms and one or more speech-generation algorithms to generate the audio output. The generated audio output that corresponds to the received first information response and the one or more second information responses, may be played in a pre-determined sequence by the one or more speakers.

Figure 3:
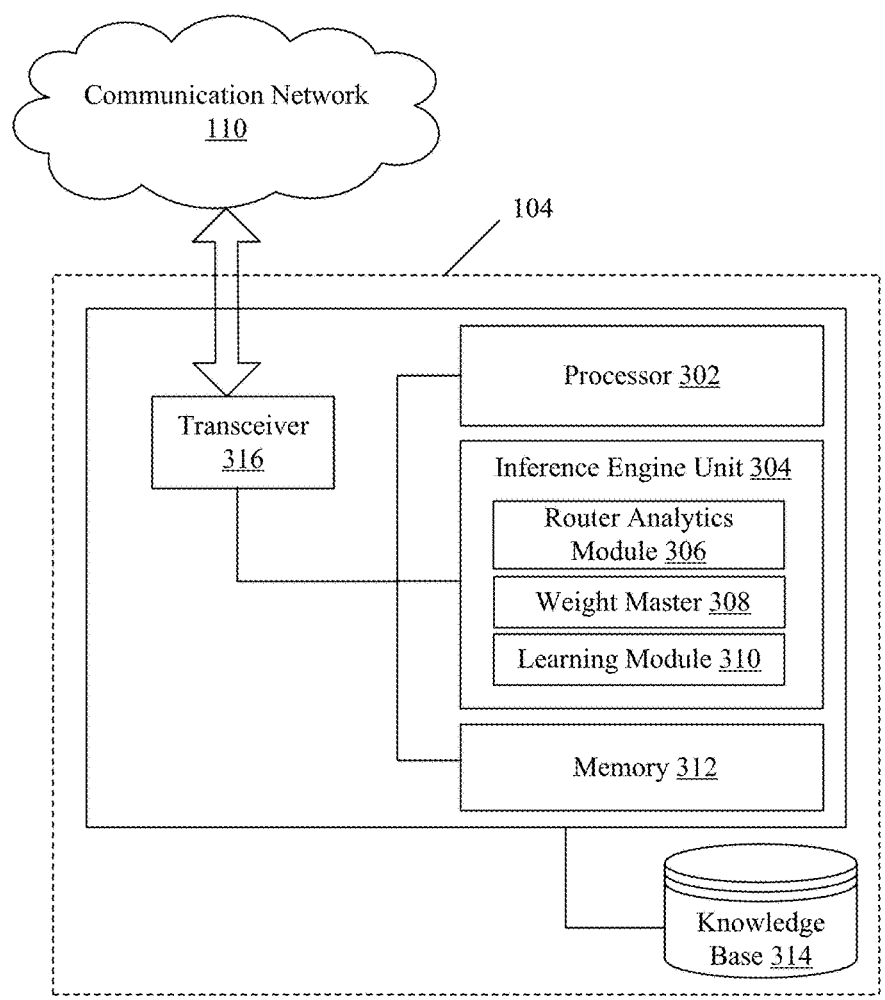
FIG. 3 is a block diagram illustrating an exemplary server, in accordance with an embodiment of the disclosure.

FIG. 3 is a block diagram illustrating an exemplary server, in accordance with an embodiment of the disclosure. FIG. 3 is explained in conjunction with elements from FIG. 1 and FIG. 2. With reference to FIG. 3, there is shown the server 104. The server 104 may comprise one or more processors, such as a processor 302, an inference engine unit 304, and a memory 312. The inference engine unit 304 may include a router analytics module 306, a weight master 308, and a learning module 310. The server 104 may further comprise a database, such as a knowledge base 314, and a transceiver 316. The processor 302 may be connected to the inference engine unit 304, the memory 312, the knowledge base 314, and the transceiver 316. The transceiver 316 may be operable to communicate with one or more electronic devices, such as the electronic device 102, and/or other servers, such as the AIML server 106, via the communication network 110.

The processor 302 may comprise suitable logic, circuitry, interfaces, and/or code that may be operable to execute a set of instructions stored in the memory 312. The processor 302 may be implemented, based on a number of processor technologies known in the art. Examples of the processor 302 may be an X86-based processor, a Reduced Instruction Set Computing (RISC) processor, an Application-Specific Integrated Circuit (ASIC) processor, a Complex Instruction Set Computing (CISC) processor, and/or other processors.

The inference engine unit 304 may comprise suitable logic, circuitry, interfaces, and/or code that may be operable to determine the first information response that may correspond to the first functional service. The inference engine unit 304 may determine the first information response when a request is received from the electronic device 102. The inference engine unit 304 may be operable to determine a set of second information responses, based on the determined first information response. Each second information response of the determined set of second information responses may correspond the set of second functional services. The set of second functional services may correspond to, but may not be limited to, an Internet Protocol (IP) telephony system, a space-based satellite navigation system, a social network, a wireless connection system, an address book system, an instant messaging system, a weather forecasting system, a camera-based system, a timer system, a user profile information system, an image processing system, a calendaring system, a video playback system, and/or a sensor-based system. Notwithstanding, the disclosure may not be so limited and any suitable system related to the first functional service and/or the second functional service may be utilized without limiting the scope of the disclosure. Examples of the inference engine unit 304 may be an X86-based processor, a Reduced Instruction Set Computing (RISC) processor, an Application-Specific Integrated Circuit (ASIC) processor, a Complex Instruction Set Computing (CISC) processor, and/or other processors.

The router analytics module 306 may comprise suitable logic, circuitry, interfaces, and/or code that may be operable to select first functional service, based on a first command. The router analytics module 306 may be operable to issue a first command, based on the response template received from the electronic device 102.

The weight master 308 may comprise suitable logic, circuitry, interfaces, and/or code to generate the weight associated with each second information response of the set of second information responses based on the weight-generating function of the weight master 308. The weight master 308 may increase or decrease weights associated with each second information response of the set of second information responses, based on learned data retrieved from the knowledge base 314. The learned data may correspond to historical data of usage pattern and/or historical data of events related to each of the determined one or more second information responses.

The learning module 310 may comprise suitable logic, circuitry, and/or interfaces that may be operable to implement artificial intelligence to learn from data stored in the memory 312. The learning module 310 may be further operable to retrieve data from the memory 312. Such data may correspond to historical data of usage pattern and/or historical data of events related to each of the determined one or more second information responses. The learning module 310 may be operable to retrieve rules from the knowledge base 314. The rules may be related to the set of second functional services. The learning module 310 may be operable to apply the retrieved rules to the retrieved data to deduce learned data that may be related to the set of second functional services. The learning module 310 may be further operable to store the learned data in the knowledge base 314. The learning module 310 may be implemented based on one or more approaches, such as, an artificial neural network (ANN), an inductive logic programming approach, a support vector machine (SVM), an association rule learning approach, a decision tree learning approach, and/or a bayesian network. Notwithstanding, the disclosure may not be so limited and any suitable learning approach may be utilized without limiting the scope of the disclosure.

The memory 312 may comprise suitable logic, circuitry, and/or interfaces that may be operable to store a machine code and/or a computer program with at least one code section executable by the processor 302. In an embodiment, the memory 312, in association with the AIML database 108, may further be operable to store instructions to execute the AIML interpreter to generate the response template. The memory 312 may be further operable to store data that may correspond to historical data of usage pattern and/or historical data of events related to each of the determined one or more second information responses. Examples of implementation of the memory 312 may include, but are not limited to, Random Access Memory (RAM), Read Only Memory (ROM), Hard Disk Drive (HDD), and/or a Secure Digital (SD) card.

The knowledge base 314 may comprise suitable logic, circuitry, and/or interfaces that may be operable to store rules that may be related to the set of second functional services. The knowledge base 314 may be further operable to store learned data received from the learning module 310. Such learned data may be based on the historical data of usage pattern and/or the historical data of events related to each of the selected one or more second information responses stored in the memory 312.

The transceiver 316 may comprise suitable logic, circuitry, interfaces, and/or code that may be operable to receive requests from one or more subscribed devices, such as the electronic device 102. The transceiver 316 may be operable to communicate with one or more other servers, such as the AIML server 106, via the communication network 110. In an embodiment, the transceiver 316 may be further operable to communicate with one or more base station transceivers (not shown) within coverage area of the electronic device 102, such as a smartphone. The transceiver 316 may implement known technologies to support wired or wireless communication of the server 104 with the communication network 110. The transceiver 316 may include, but is not limited to, an antenna, a radio frequency (RF) transceiver, one or more amplifiers, a tuner, one or more oscillators, a digital signal processor, a coder-decoder (CODEC) chipset, and/or a local buffer. The transceiver 316 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

In operation, the transceiver 316 in the server 104 may be operable to receive the response template from the electronic device 102. In an embodiment, the response template may be generated by the electronic device 102. In an embodiment, the response template may be generated by the AIML server 106. In an embodiment, the electronic device 102 may receive the response template from the AIML server 106 and may communicate the response template to the server 104. In an embodiment, the response template may correspond to the input provided by the user 116 to the electronic device 102, via the intelligent UI 114 rendered on the display screen 112 of the electronic device 102. In an embodiment, the file structure of the response template may be based on AIML format. In an embodiment, the transceiver 316 may be operable to receive a system specific command from the AIML interpreter of the AIML server 106. In an embodiment, the transceiver 316 may be operable to communicate the system specific command to the inference engine unit 304, using the processor 302.

In an embodiment, the router analytics module 306 may be operable to issue a first command, based on the response template. The response template may be received from the electronic device 102, based on the input provided by the user 116 associated with the electronic device 102. In an embodiment, the first command may comprise one or more instructions related to the user input. Based on the first command, the inference engine unit 304 may select a first sub-system from a plurality of first sub-systems, such that the first sub-system may provide the first functional service. In an embodiment, the inference engine unit 304 may be operable to determine the first information response, in reply to the first command issued by the router analytics module 306. In an embodiment, the inference engine unit 304 may be operable to select the determined first functional service that may be communicated to the electronic device 102, via the communication network 110. In an embodiment, the first sub-system, in association with the inference engine unit 304, may be operable to issue a second command, to determine the set of second sub-systems, based on the first information response. In an embodiment, the second command may comprise one or more instructions related to the issued first command and/or the determined first information response. Each sub-system of the set of second sub-systems may generate an information response that may correspond to the set of second functional services. In an embodiment, the inference engine unit 304 may be further operable to select one or more second information responses from the determined set of second information responses, based on the associated weight assigned by the weight master 308. The processor 302 may be further operable to communicate the determined first information response and the selected one or more second information responses to the electronic device 102.

Figure 4:
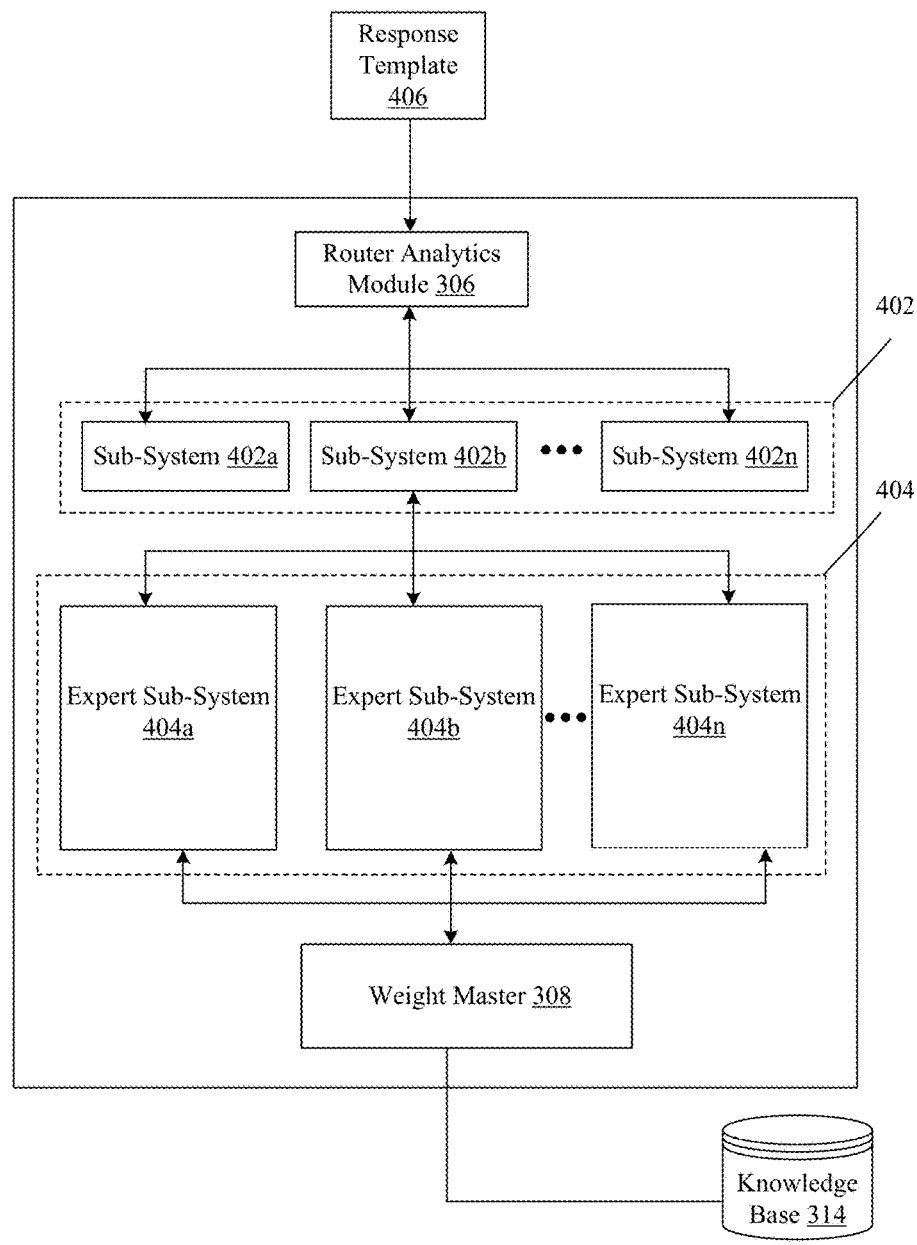
FIG. 4 is a block diagram illustrating an exemplary implementation of an inference engine unit, in accordance with an embodiment of the disclosure.

FIG. 4 is a block diagram illustrating an exemplary implementation of the inference engine unit 304 in the server 104, in accordance with an embodiment of the present disclosure. FIG. 4 is explained in conjunction with elements from FIG. 1 and FIG. 3. With reference to FIG. 4, there is shown a set of first sub-systems 402, a set of second sub-systems 404, a response template 406, the router analytics module 306, the weight master 308 and the knowledge base 314. The set of first sub-systems 402 may include one or more first sub-systems, such as the first sub-system 402a to 402n. Each sub-system of the set of second sub-systems 404 may be associated with an expert sub-system, such as one of expert sub-system 404a to 404n. The router analytics module 306, the weight master 308 and the knowledge base 314 have been described in detail in FIG. 3.

The set of first sub-systems 402 may be communicatively coupled with the router analytics module 306. Each sub-system of the set of second sub-systems 404 may be correspond to an expert sub-system, such as one of the expert sub-systems 404a to 404n. The weight master 308 may be connected to the knowledge base 314. Each of the expert sub-systems, such as expert sub-systems 404a to 404n, may be communicatively coupled with the weight master 308. The set of first sub-systems 402 may be communicatively coupled with the electronic device 102 (FIG. 1).

The set of first sub-systems 402 may comprise suitable logic, circuitry, interfaces, and/or code that may be operable to provide a first functional service, such as Wi-Fi and Maps. Each first sub-system 402a to 402n of the set of first sub-systems 402 may provide one functional service. In an embodiment, the set of first sub-systems 402 may be associated with interfaces of various peripheral devices of the electronic device 102, which provide the first functional service.

The set of second sub-systems 404 may comprise suitable logic, circuitry, interfaces, and/or code that may be operable to provide a set of second functional services. Each sub-system of the set of second sub-systems 404 may correspond to an expert sub-system, such as one of the expert sub-systems 404a to 404n related to the one of the first functional service or one of the set of second functional services. The first functional service and the set of second functional services may correspond to, but may not be limited to, a telephony system, a space-based satellite navigation system, a wireless connection system, an address book system, an instant messaging system, a weather forecasting system, a camera-based system, a timer system, a user profile information system, an image processing system, a calendaring system, a video playback system, and/or a sensor-based system. In an embodiment, the telephony system may be an Internet Protocol (IP) telephony system. In an embodiment, the space-based satellite navigation system may be a Global Positioning System (GPS).

The expert sub-systems, such as the expert sub-systems 404a to 404n may comprise suitable logic, circuitry, interfaces, and/or code that may be operable to determine a set of second information responses based on the first information response. Each of the expert sub-systems, such as the expert sub-systems 404a to 404n, may be implemented in association with the inference engine unit 304 and the knowledge base 314.

In operation, the router analytics module 306 may be operable to issue a first command, based on the response template 406 received from the electronic device 102. The response template may be generated based on an input provided by the user 116. For example, for an input, such as "Show Restaurants nearby", provided by the user 116, the generated response template may comprise multiple set of tags to indicate suitable information related to the user input. The multiple set of tags may comprise a first set of tags, a second set of tags, a third set of tags, and a fourth set of tags, for example. The first set of tags, such as, an open tag "<Eri>", and a close tag, "</Eri>", may represent delimiters for the response template 406. The second set of tags, such as an open tag, "<Map>", and a close tag, "</Map>", enclosed within the first set of tags, may represent a first functional service related to maps service. The third set of tags, such as an open tag, "<Marker>", and a close tag, "</Marker>", enclosed within the second set of tags, may represent a keyword, such as, "Restaurant", obtained from the user input. The fourth set of tags, such as an open tag, "<Loc>", and a close tag, "</Loc>", enclosed within the second set of tags, may represent a current location, such as "CL", of the electronic device 102. Notwithstanding, the disclosure may not be so limited and any number of tags may be utilized without limiting the scope of the disclosure.

Based on the first command, such as, "Locate Marker=Restaurant, Location=CL", issued by the router analytics module 306, the inference engine unit 304 may select a first sub-system, such as a maps sub-system, from the set of first sub-systems 402. The selected first sub-system 402b may provide the first information response, such as a map that shows nearby restaurants, that may correspond to the related first functional service, such as maps service. In an embodiment, the first information response may be a default response. In an embodiment, the domain of the first functional service may be the same as that of the domain of the input provided by the user 116, via the intelligent UI 114.

The first functional service may be provided by the selected first sub-system 402b. In an embodiment, the selected first sub-system 402b may be operable to issue a second command, such as "Restaurant Name=X, Location=Y", based on the determined first information response. The second command may initiate determination of the set of second information responses. In an embodiment, the set of second information responses may be value-added responses that may be generated by the expert sub-systems, such as expert sub-systems 404a to 404n. The value-added responses may be related to the set of second functional services that may differ from each other. Thus, the set of second information responses may mimic intelligent responses. Such intelligent responses may include, but are not limited to, emotions (such as "Hi! ☺"), empathy and sympathy (such as "Oh!"), suggestions (such as "Well, I would advise you to . . . "), opinions (such as "I think you should . . . "), decisions (such as "Ok . . . Let's go this way . . . "), actions (such as "Let's do it!"), and/or statements (such as "Calling your friend . . . ").

The second command may be issued to each of the expert sub-systems, such as expert sub-systems 404a to 404n. In an embodiment, a pre-determined number of expert sub-systems, such as expert sub-systems 404a to 404n, may be mapped with each first sub-system of the set of first sub-systems 402. In an embodiment, the inference engine unit 304 may be operable to select a set of second functional services, based on issued second command.

Each of the expert sub-systems, such as the expert sub-systems 404a to 404n, may be operable to determine a corresponding second information response, based on the second command issued by the first sub-system, such as one of the set of first sub-systems 402. With reference to the above-mentioned example, the expert sub-system 404a, such as, "Contacts sub-system", may generate two second information responses, such as, "Restaurant X's Phone No." and "Restaurant X's Phone No. called 4 times". Similarly, the expert sub-system 404b, such as "Credit card sub-system" may generate a second information response, such as, "Balance limit on Credit Card".

In an embodiment, the weight master 308 may utilize a weight-generating function to generate the weight associated with each second information response of the set of second information responses. With reference to the above-mentioned example, the weight-generating function in the weight master 308 may generate a weight, such as "4", associated with the second information response "Restaurant X's Phone No.". The weight-generating function in the weight master 308 may further generate a weight, such as "6", associated with the second information response "Restaurant X's Phone No. called 4 times". The weight-generating function in the weight master 308 may further generate a weight, such as "7", associated with the second information response "Balance limit on Credit Card".

In an embodiment, the weight master 308 may be operable to modify the generated weights associated with each second information response of the set of second information responses. The modification of the generated weights may be based on the learned data retrieved from the knowledge base 314. Such learned data may correspond to the historical data of usage pattern and/or events. Such a modification of the generated weights may comprise an increase or decrease of generated weights associated with each second information response of the set of second information responses performed by the weight master 308.

In an embodiment, the weight master 308 may be operable to dynamically select one or more of the set of second information responses, based on determination of the weight higher than a threshold value. In an embodiment, one or more second information responses may be selected, based on determination of the weight that may be of a maximum value amongst all the generated weights. With reference to the above-mentioned example, the weight master 308 may be operable to dynamically select the second information response, such as "Balance limit on Credit Card", based on determination of the weight with a maximum value, such as the maximum value "7". In an embodiment, the weight master 308 may be operable to notify other expert sub-systems, such as the expert sub-system 404a, and the expert sub-systems 404c to 404n. The notification by the weight master 308 may be about the selected one of the set of second information responses generated by one of the expert sub-systems, such as the expert sub-system 404b.

In an embodiment, the processor 302 may be operable to communicate the determined first information response and the selected one or more second information responses to the electronic device 102. In an embodiment, the processor 302, in association with the learning module 310, the memory 312, and the knowledge base 314, may modify a presentation format of the first information response and the selected one or more second information response. The presentation format of the first information response and the selected one or more second information responses may be modified to include, but not limited to, grammatical articles, such as, "a", "an" or "the", verbs, such as "is", "am", or "are", and/or emoticons, such as ":-)", ":-/", or ":-(". With reference to the above-mentioned example, the first information response may be modified to be presented as, "[Location of Restaurant X is Y", <image: map>]", and the second information response, such as "Balance limit on Credit Card :-(", to the electronic device 102. Such intelligent responses may enable the electronic device 102 to more eloquently converse with the user 116.

Figure 5A:
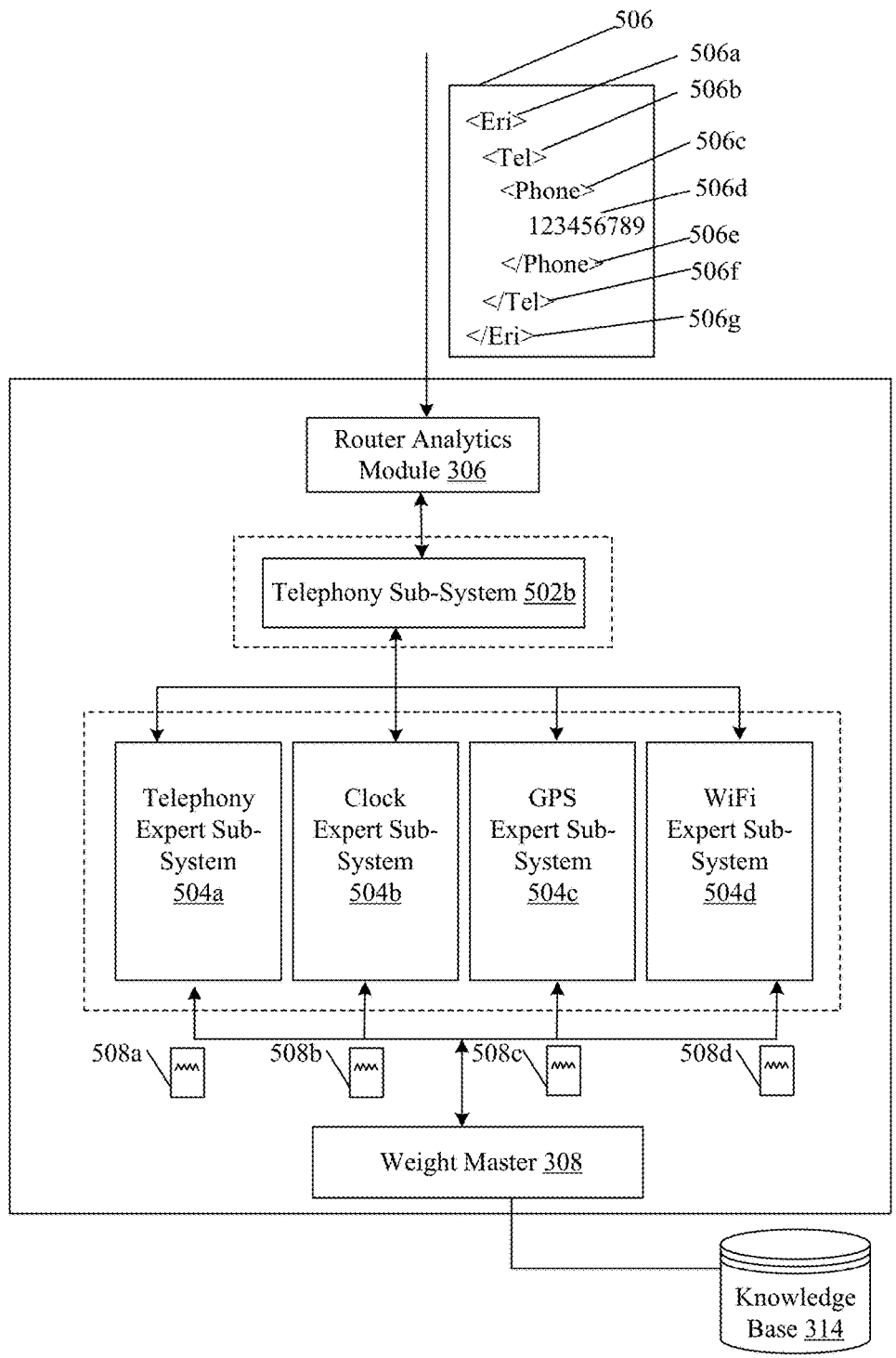
FIGS. 5A and 5B illustrate two aspects of a first exemplary scenario for the disclosed implementation of the inference engine unit for providing information, in accordance with an embodiment of the disclosure.
Figure 5B:
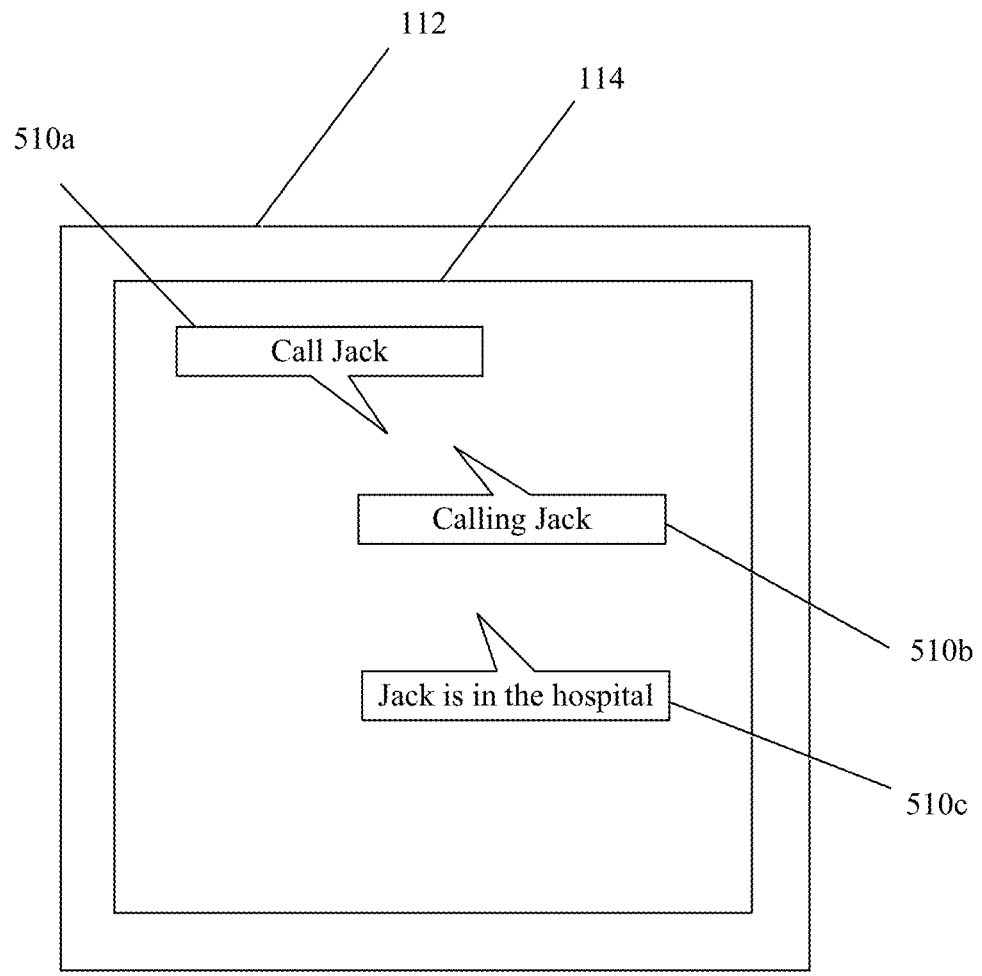

FIGS. 5A and 5B illustrate two aspects of a first exemplary scenario for the disclosed implementation of the inference engine unit 304 for providing information to the intelligent UI 114, in accordance with an embodiment of the present disclosure. FIGS. 5A and 5B are described in conjunction with elements of FIG. 1, FIG. 2, FIG. 3 and FIG. 4. With reference to FIG. 5A, there is shown a telephony sub-system 502b, a telephony expert sub-system 504a, a clock expert sub-system 504b, a GPS expert sub-system 504c, and a Wi-Fi expert sub-system 504d. There is further shown a telephony response template 506, and a set of second information responses 508a to 508d. The telephony response template 506 may comprise multiple set of tags, such as tags 506a to 506g to indicate suitable information. A first set of tags, such as an open tag 506a, "<Eri>", and a close tag 506g, "</Eri>", may represent delimiters for the telephony response template 506. A second set of tags, such as an open tag 506b, "<Tel>", and a close tag 506f, "</Tel>", enclosed within the first set of tags, may represent a telephony functional service. A third set of tags, such as an open tag 506c, "<Phone>", and a close tag 506e, "</Phone>", enclosed within the second set of tags, may comprise phone number data 506d, "23456789".

In accordance with a first exemplary scenario, the telephony sub-system 502b may correspond to the first sub-system of the set of first sub-systems 402. The telephony expert sub-system 504a, the clock expert sub-system 504b, the GPS expert sub-system 504c, and the Wi-Fi expert sub-system 504d may correspond to the expert sub-systems 404a to 404n. The telephony response template 506 may correspond to the response template 406.

In operation, an input may be provided by the user 116, which may be associated with the electronic device 102 (such as a smartphone). The input may correspond to a phone call request provided by the user 116. The phone call may be based on a selection of a contact number from the address book stored in the memory 204. Based on the selected contact number, the electronic device 102 may determine the telephony response template 506.

In an embodiment, the telephony response template 506 may be communicated from the electronic device 102 to the server 104. The router analytics module 306 may be operable to issue a first command based on the telephony response template 506. The inference engine unit 304 may be operable to select a first sub-system, such as the telephony sub-system 502b, based on the first command issued by the router analytics module 306. The selected telephony sub-system 502b may be operable to determine a first information response, such as, "[Call, 23456789]" that is related to the telephony functional service.

The selected telephony sub-system 502b may be operable to issue a second command based on the determined first information response. The second command, issued by the selected telephony sub-system 502b, may initiate determination of the set of second information responses, such as the second information responses 508a to 508d. The second command may be communicated to the telephony expert sub-system 504a, the clock expert sub-system 504b, the GPS expert sub-system 504c, and the Wi-Fi expert sub-system 504d. In an embodiment, a pre-determined number of the expert sub-systems 504a to 504d may be mapped with the telephony sub-system 502b.

The telephony expert sub-system 504a may generate the second information response 508a, such as, "[Call, 23456789, Favorite Call]". The clock expert sub-system 504b may generate the second information response 508b, such as, "[Call, 23456789, Bad Time]". The GPS expert sub-system 504c may generate the second information response 508c, such as, "[Call, 23456789, in Hospital]". The Wi-Fi expert sub-system 504d may generate the second information response 508d, such as, "[Call, 23456789]".

The weight master 308 may utilize the weight-generating function to generate weights associated with each of the second information responses 508a to 508d. With reference to FIG. 5A, the weight master 308 may generate the weights of the second information responses 508a to 508d as "6", "6", "7" and "0", respectively. The inference engine unit 304 may determine the weight of the second information response 508c, such as, "[Call, 23456789, in Hospital]", that has the maximum value, "7". The inference engine unit 304 may dynamically select the second information response 508c associated with the GPS expert sub-system 504c, based on the determined weight with maximum value, "7".

The weight-generating function in the weight master 308 may modify the generated weights associated with the second information responses 508a to 508d. In an embodiment, the weight master 308 may increase or decrease the generated weights based on the learned data retrieved from a knowledge base 314. Such learned data may be based on the historical data of usage pattern, and/or the historical data of events related to each of the selected one or more second information responses.

With reference to FIG. 5B, there is shown the intelligent UI 114, rendered on the display screen 112 of the electronic device 102, in accordance with the first exemplary scenario of FIG. 5A. The user 116, as a caller, may select a phone number, such as, "23456789", of a callee, "Jack". Such a request may dial the selected phone number and may present a first message 510*a*, "Call Jack", on the intelligent UI 114. The electronic device 102 may receive the first information response and the second information response from the server 104. The intelligent UI 114 may present a second message 510*b*, "Calling Jack", which may correspond to the received first information response. The intelligent UI 114 may further present a third message 510*c*, "Jack is in the hospital", that corresponds to the received second information response. The third message 510*c* presented on the intelligent UI 114 may be a value-added response that may use location data of the GPS and mimic an intelligent response. Such an intelligent response may correspond to a suggestion for the user 116.

Figure 6A:
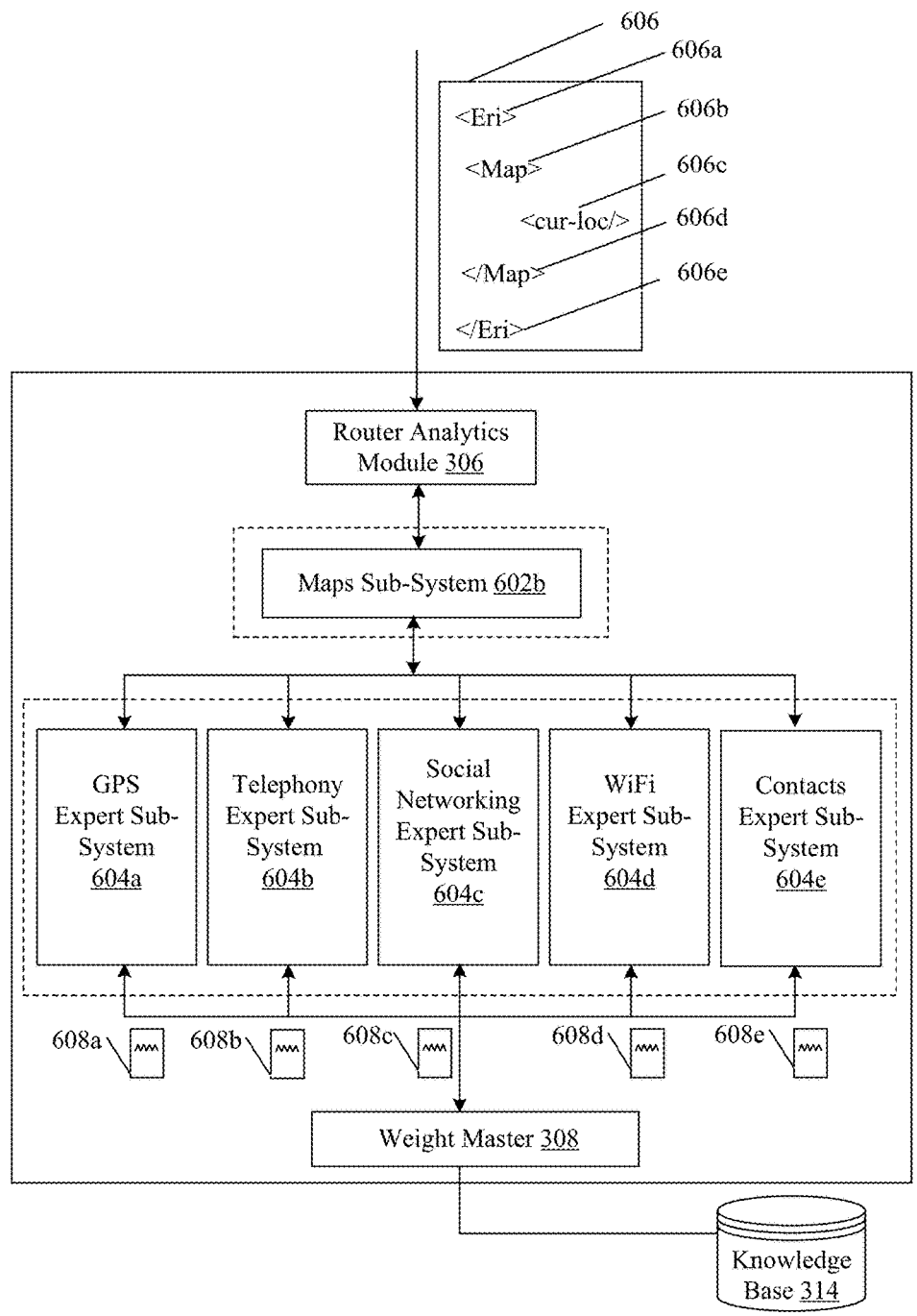
FIGS. 6A and 6B illustrate two aspects of a second exemplary scenario for the disclosed implementation of the inference engine unit for providing information, in accordance with an embodiment of the disclosure.
Figure 6B:
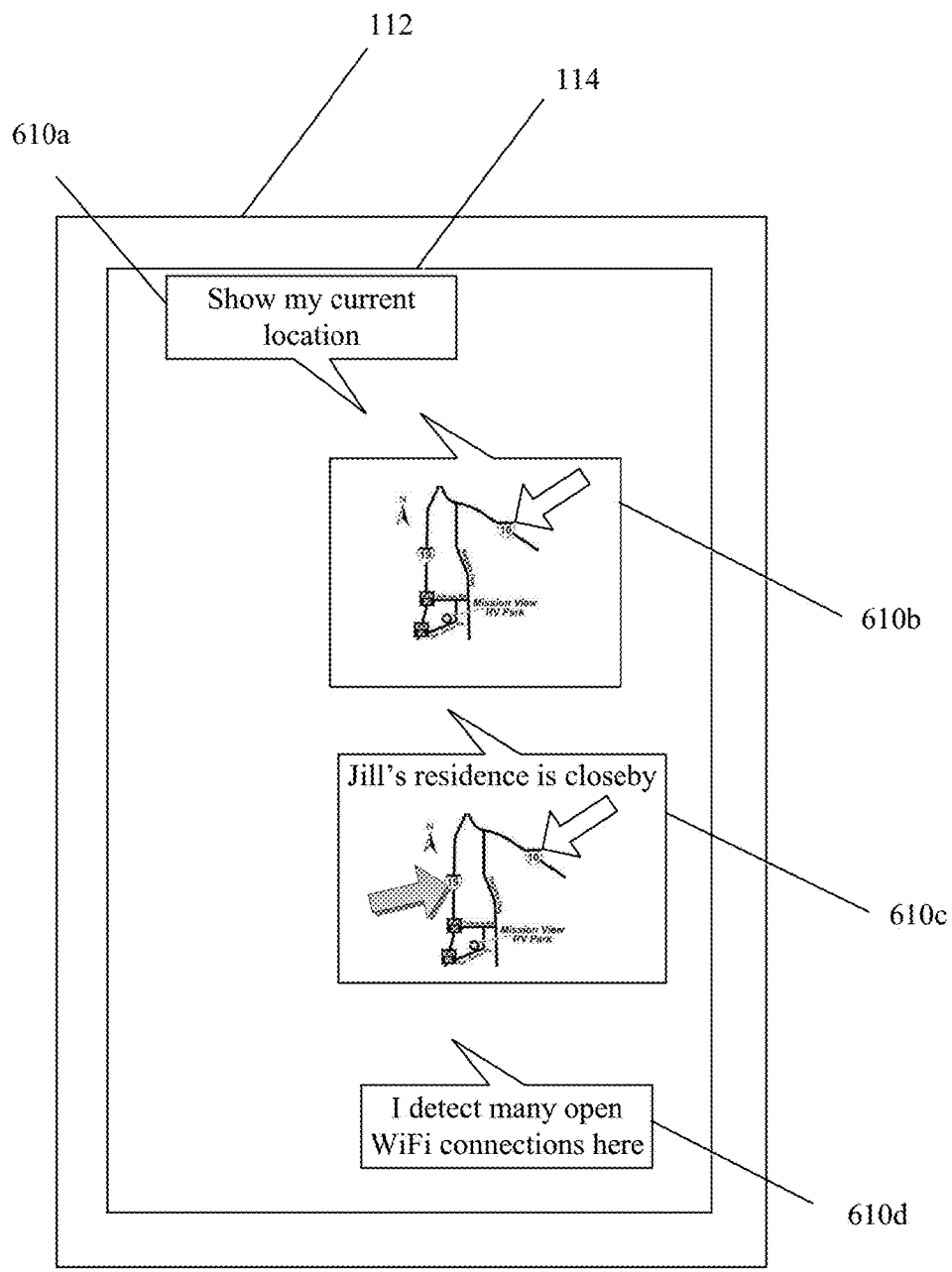

FIGS. 6A and 6B illustrate two aspects of a second exemplary scenario for the disclosed implementation of the inference engine unit 304 for providing information to the intelligent UI 114, in accordance with an embodiment of the disclosure. FIGS. 6A and 6B are described in conjunction with elements of FIG. 1, FIG. 2, FIG. 3 and FIG. 4. With reference to FIG. 6A, there is shown a maps sub-system 602*b*, a GPS expert sub-system 604*a*, a telephony expert sub-system 604*b*, a social networking expert sub-system 604*c*, a Wi-Fi expert sub-system 604*d*, and a contacts expert sub-system 604*e*. There is further shown a map-based response template 606, and a set of second information responses 608*a* to 608*e*. The map-based response template 606 may comprise multiple set of tags, such as tags 606*a* to 606*e* to indicate suitable information. A first set of tags, such as an open tag 606*a*, "<Eri>", and a close tag 606*e*, "</Eri>", may represent delimiters for the map-based response template 606. A second set of tags, such as an open tag 606*b*, "<Map>", and a close tag 606*d*, "</Map>", enclosed within the first set of tags, may comprise a location search request data 606*c*, such as, "<cur-loc/>", as provided by the user 116.

In accordance with a second exemplary scenario, the maps sub-system 602*b* may correspond to the first sub-system of the set of first sub-systems 402. The maps sub-system 602*b*, the GPS expert sub-system 604*a*, the telephony expert sub-system 604*b*, the social networking expert sub-system 604*c*, the Wi-Fi expert sub-system 604*d*, and the contacts expert sub-system 604*e* may correspond to the expert sub-systems 404*a* to 404*n*. The map-based response template 606 may correspond to the response template 406.

In operation, an input may be provided by the user 116 associated with the electronic device 102 (such as a smartphone). The input may correspond to a location search request that may be provided by the user 116, based on a touch-based input, or a voice-based input. For example, the user 116 may provide a touch-based input to type a query, such as, "Show my current location", via the virtual keyboard. Based on the query provided by the user 116, the electronic device 102 may determine a response template, such as the map-based response template 606.

In an embodiment, the map-based response template 606 may be communicated from the electronic device 102 to the server 104. The router analytics module 306 may be operable to issue a first command based on the map-based response template 606. The inference engine unit 304 may be operable to select a first sub-system, such as the maps sub-system 602*b*, based on the first command issued by the router analytics module 306. The selected maps sub-system 602*b* may be operable to determine a first information response to show the current location, such as, "Current location is . . . ", which may be related to the maps functional service.

The selected maps sub-system 602*b* may be operable to issue a second command based on the determined first information response. The second command issued by the selected maps sub-system 602*b* may initiate determination of the set of second information responses 608*a* to 608*e*. The second command may be communicated to the GPS expert sub-system 604*a*, the telephony expert sub-system 604*b*, the social networking expert sub-system 604*c*, the Wi-Fi expert sub-system 604*d*, and the contacts expert sub-system 604*e*. In an embodiment, a pre-determined number of the expert sub-systems 604*a* to 604*e* may be mapped with the maps sub-system 602*b*.

The GPS expert sub-system 604*a* may generate the second information response 608*a*, such as, "[show-cur-loc, <image: map with current location>]". The telephony expert sub-system 604*b* may generate the second information response 608*b*, such as, "[show-cur-loc, Network is weak]". The social networking expert sub-system 604*c* may generate the second information response 608*c*, such as, "[show-cur-loc, show location on wall]". The Wi-Fi expert sub-system 604*d* may generate the second information response 608*d*, such as, "[show-cur-loc, Open network available]". The contacts expert sub-system 604*e* may generate the second information response 608*e*, such as, "[show-cur-loc, XXX's residence nearby]".

The weight master 308 may utilize the weight-generating function to generate weights associated with each of the second information responses 608*a* to 608*e*. With reference to FIG. 6A, the weight master 308 may generate the weights of the second information responses 608*a* to 608*e* as, "6", "7", "6", "8", and "8", respectively. The inference engine unit 304 may determine the weight of the second information responses 608*d* and 608*e* that both have the maximum value, "8". The inference engine unit 304 may dynamically select the second information responses 608*d* and 608*e* associated with the Wi-Fi expert sub-system 604*d*, and the contacts expert sub-system 604*e*, respectively, based on the determined weight with maximum value, "8".

The weight-generating function in the weight master 308 may modify the generated weights associated with the second information responses 608*a* to 608*e*. In an embodiment, the weight master 308 may increase or decrease the generated weights based on the learned data retrieved from a knowledge base 314. Such learned data may correspond to the historical data of usage pattern, and/or the historical data of events related to each of the selected one or more second information responses.

With reference to FIG. 6B, there is shown the intelligent UI 114, rendered on the display screen 112 of the electronic device 102, in accordance with the second exemplary scenario of FIG. 6A. The user 116 may provide input, such as a first message 610*a*, "Show my current location", to determine a current location. The electronic device 102 may be operable to receive a first information response and two second information responses from the server 104. The intelligent UI 114 may present a map that represents the current location of the user 116, as a second message 610*b* that corresponds to the received first information response. The intelligent UI 114 may further present a third message 610*c*, "Jill's residence is close by", and an associated location in the map presented as a second message 610*b*. The intelligent UI 114 may further present a fourth message 610*d*, "I detect many open Wi-Fi connections here", and an associated location in the map presented as a second message 610*b*. The third message 610*c* and the fourth message 610*d* may correspond to the received two second information responses generated by the contacts expert sub-system 604e, and the Wi-Fi expert sub-system 604d, respectively. The third message 610c and the fourth message 610d presented on the intelligent UI 114 may be value-added responses that may use contacts data and the Wi-Fi data to mimic intelligent responses. Such intelligent responses may correspond to a suggestion for the user 116.

Figure 7A:
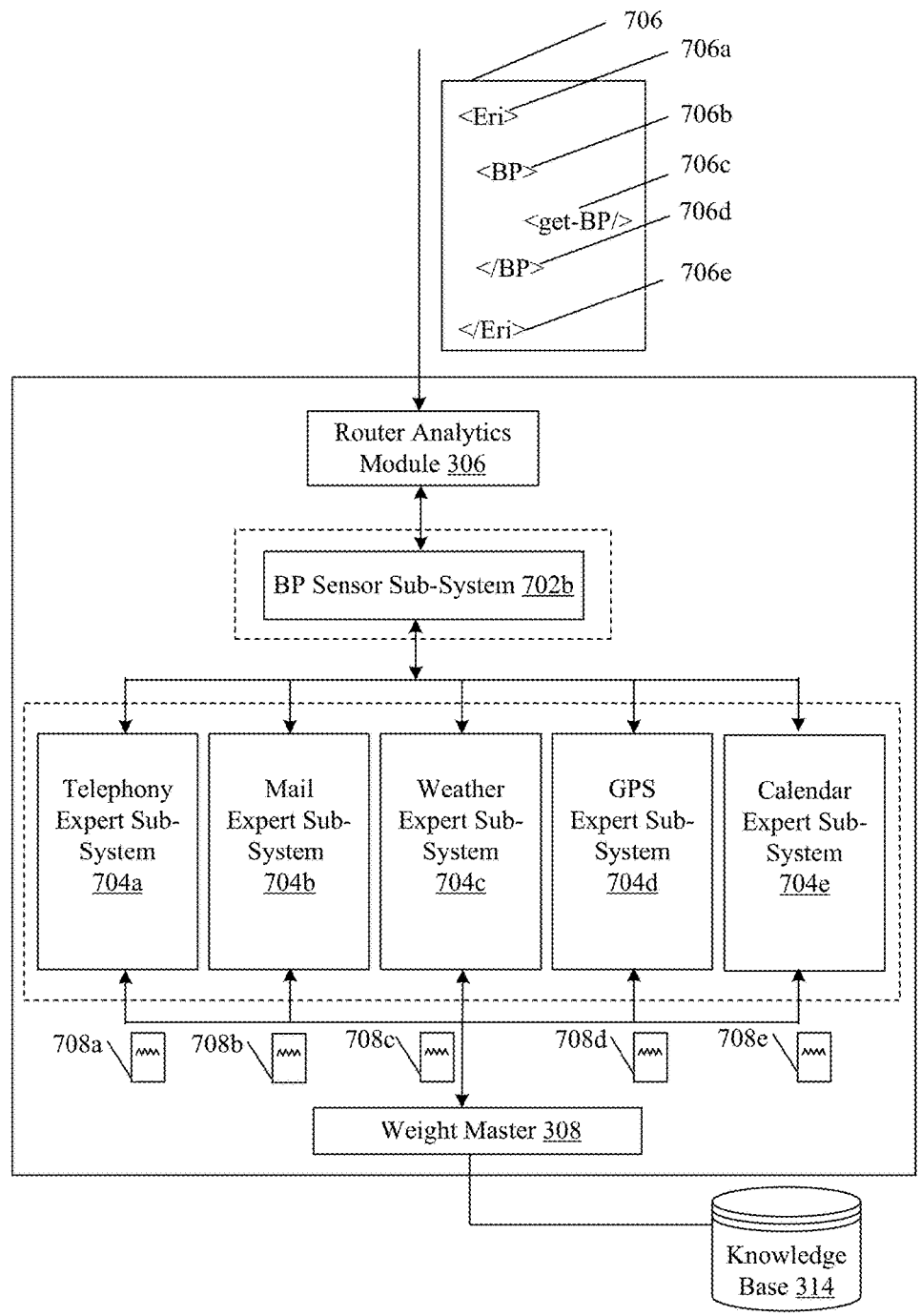
FIGS. 7A and 7B illustrate two aspects of a third exemplary scenario for the disclosed implementation of the inference engine unit for providing information, in accordance with an embodiment of the disclosure.
Figure 7B:
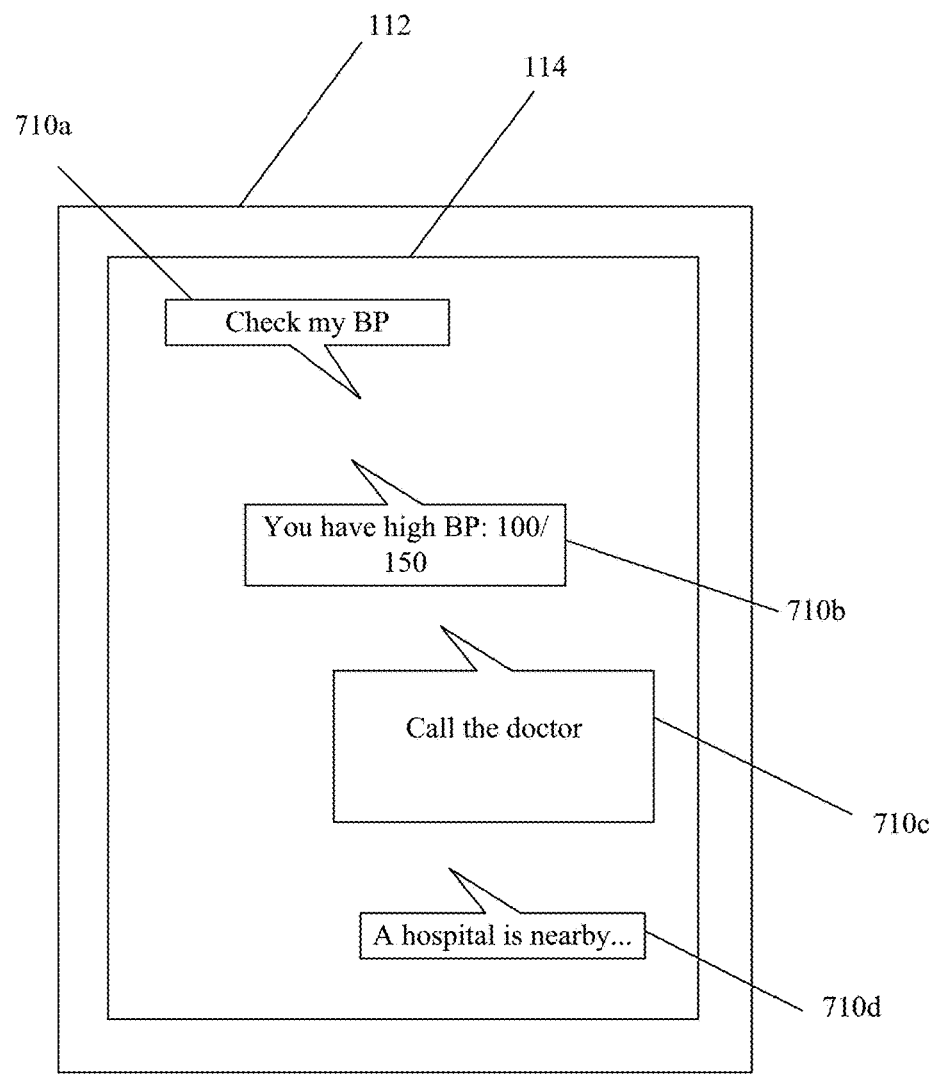

FIGS. 7A and 7B illustrate two aspects of a third exemplary scenario for the disclosed implementation of the inference engine unit 304 for providing information to the intelligent UI 114, in accordance with an embodiment of the disclosure. FIGS. 7A and 7B are described in conjunction with elements of FIG. 1, FIG. 2, FIG. 3 and FIG. 4. With reference to FIG. 7A, there is shown a Blood Pressure (BP) sensor sub-system 702b, a telephony expert sub-system 704a, a mail expert sub-system 704b, a weather expert sub-system 704c, a GPS expert sub-system 704d, and a calendar expert sub-system 704e. There is further shown a health-based response template 706, and a set of second information responses 708a to 708e. The health-based response template 706 may comprise multiple set of tags, such as tags 706a to 706e to indicate suitable information. A first set of tags, such as an open tag 706a, "<Eri>", and a close tag 706e, "</Eri>", may represent delimiters for the health-based response template 706. A second set of tags, such as an open tag 706b, "<BP>", and a close tag 706d, "</BP>", enclosed within the first set of tags, may comprise the health check request data 706c, such as "<get-BP/>", to check the BP of the user 116.

In accordance with a third exemplary scenario, the BP sensor sub-system 702b may correspond to the first sub-system of the set of first sub-systems 402. The telephony expert sub-system 704a, the mail expert sub-system 704b, the weather expert sub-system 704c, the GPS expert sub-system 704d, and the calendar expert sub-system 704e may correspond to the expert sub-systems 404a to 404n. The health-based response template 706 may correspond to the response template 406.

In operation, an input may be provided by the user 116 associated with the electronic device 102 (such as a smartphone). The user input may correspond to a health-check request provided by the user 116, based on a touch-based or a voice-based input. For example, the user 116 may provide an audio input, such as, "Check my BP", via the I/O device 206 (such as a microphone). Based on the audio input provided by the user 116, the electronic device 102 may determine a response template, such as the health-based response template 706.

In an embodiment, the health-based response template 706 may be communicated from the electronic device 102 to the server 104. The router analytics module 306 may be operable to issue a first command based on the health-based response template 706. The inference engine unit 304 may be operable to select a first sub-system, such as BP sensor sub-system 702b, based on the first command issued by the router analytics module 306. The selected BP sensor sub-system 702b may be operable to determine a first information response to show the current BP that corresponds to health-check functional service of the selected BP sensor sub-system 702b.

The selected BP sensor sub-system 702b may be operable to issue a second command based on the determined first information response. The second command issued by the selected BP sensor sub-system 702b may initiate determination of the set of second information responses 708a to 708e. The second command may be communicated to the telephony expert sub-system 704a, the mail expert sub-system 704b, the weather expert sub-system 704c, the GPS expert sub-system 704d, and the calendar expert sub-system 704e. In an embodiment, a pre-determined number of the expert sub-systems 704a to 704e may be mapped with the BP sensor sub-system 702b.

The telephony expert sub-system 704a may generate the second information response 708a, such as, "[get-BP, High BP: call doctor]". The mail expert sub-system 704b may generate the second information response 708b, such as, "[get-BP, Send report to Hospital]". The weather expert sub-system 704c may generate the second information response 708c, such as, "[get-BP, current weather not suitable]". The GPS expert sub-system 704d may generate the second information response 708d, such as, "[get-BP, a hospital is nearby]". The calendar expert sub-system 704e may generate the second information response 708e, such as, "[get-BP, BP last checked on date . . . ]".

The weight master 308 may utilize the weight-generating function to generate weights associated with each of the second information responses 708a to 708e. With reference to FIG. 7A, the weight master 308 may generate the weights of the second information responses 608a to 608e as "8", "6", "5", "8" and "5", respectively. The inference engine unit 304 may determine the weight of the second information responses 708a and 708d that have the maximum value, "8". The inference engine unit 304 may dynamically select the second information responses 708a and 708d, which are associated with the telephony expert sub-system 704a, and the GPS expert sub-system 704d, respectively, based on the determined weights with maximum value, "8".

The weight-generating function in the weight master 308 may modify the generated weights associated with the second information responses 708a to 708e. In an embodiment, the weight master 308 may increase or decrease the generated weights based on the learned data retrieved from a knowledge base 314. Such learned data may be based on the historical data of usage pattern, and/or the historical data of events related to each of the selected one or more second information responses.

With reference to FIG. 7B, there is shown the intelligent UI 114, rendered on the display screen 112 of the electronic device 102, in accordance with the first exemplary scenario of FIG. 7A. The user 116 may provide an audio input, such as, "Check my BP", to determine the current BP. A first message 710a, "Check my BP", may be presented on the intelligent UI 114. The processor 202 may be operable to determine the first message 710a, based on an execution of a speech-to-text conversion algorithm stored in the memory 204. The electronic device 102 may be operable to receive the first information response, and two second information responses from the server 104. The intelligent UI 114 may present a second message 710b, "You have high BP: 100/150" that corresponds to the received first information response. The intelligent UI 114 may further present a third message 710c, "Call the doctor", and a fourth message 710d, "A hospital is nearby . . . " The third message 710c and the fourth message 710d may correspond to the received two second information responses generated by the telephony expert sub-system 704a, and the GPS expert sub-system 704d, respectively.

The third message 710c and the fourth message 710d presented on the intelligent UI 114 may be value-added responses that may use the telephony and the GPS data to mimic intelligent responses. Such intelligent responses may correspond to a suggestion for the user 116.

Figure 8:
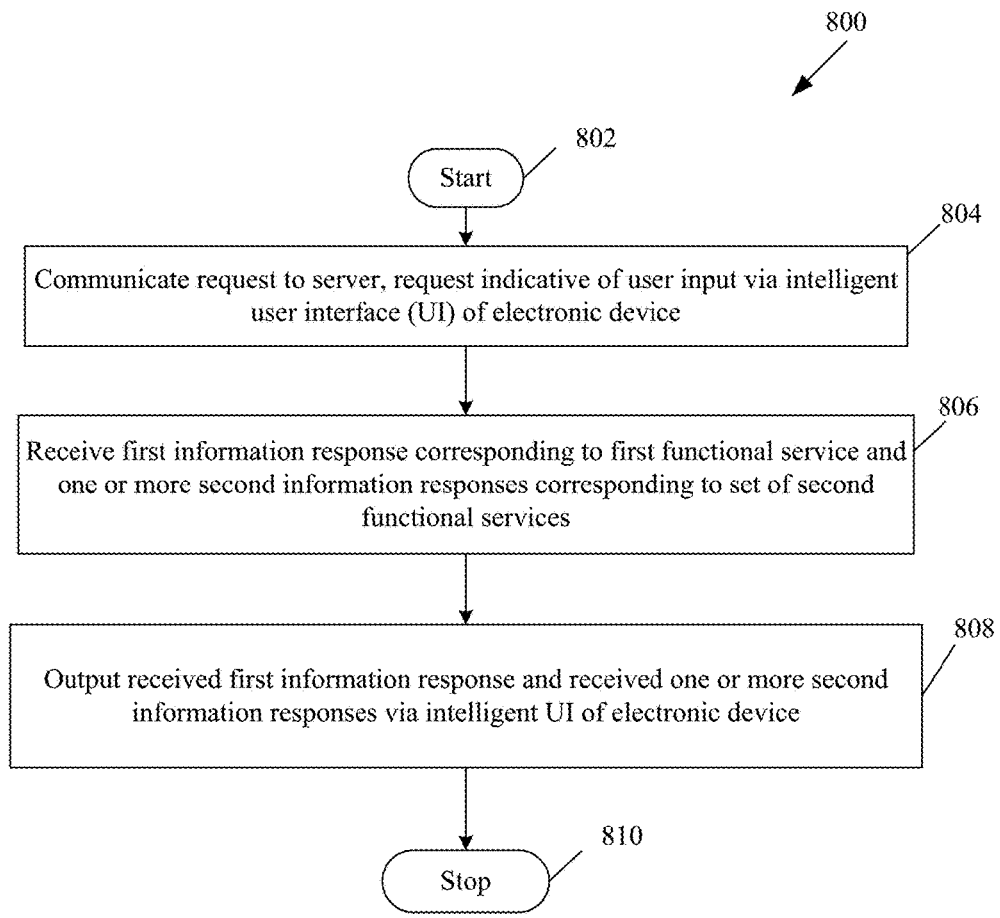
FIG. 8 is a flow chart illustrating an exemplary method for providing information via an intelligent user interface, in accordance with an embodiment of the disclosure.

FIG. 8 is an exemplary flow chart illustrating an exemplary method for providing information, in accordance with an embodiment of the disclosure. With reference to FIG. 8, there is shown a flow chart 800. The flow chart 800 is described in conjunction with FIGS. 1, 2, 3, and 4. The method starts at step 802 and proceeds to step 804.

At step 804, a request may be communicated to the server 104. The request may be indicative of input provided by the user 116, via the intelligent UI 114. The intelligent UI 114 may be rendered on the display screen 112 of the electronic device 102. In an embodiment, the response template 406 may be determined by the electronic device 102, based on the received user input, and may be communicated to the server 104. In an embodiment, the response template 406 may be received by the electronic device 102, from the AIML server 106, and electronically communicated to the server 104.

At step 806, a first information response and one or more second information responses may be received from the server 104. The first information response may correspond to a first functional service. The one or more second information responses may correspond to a set of second functional services. At step 808, the received first information response and the received one or more second information responses may be outputted, via the intelligent UI 114. The received first information response and the received one or more second information responses may be an audio output generated by one or more speakers of the electronic device 102. The received first information response and the received one or more second information responses may be a visual output presented on the display screen 112 of the electronic device 102. Control passes to end step 810.

Figure 9:
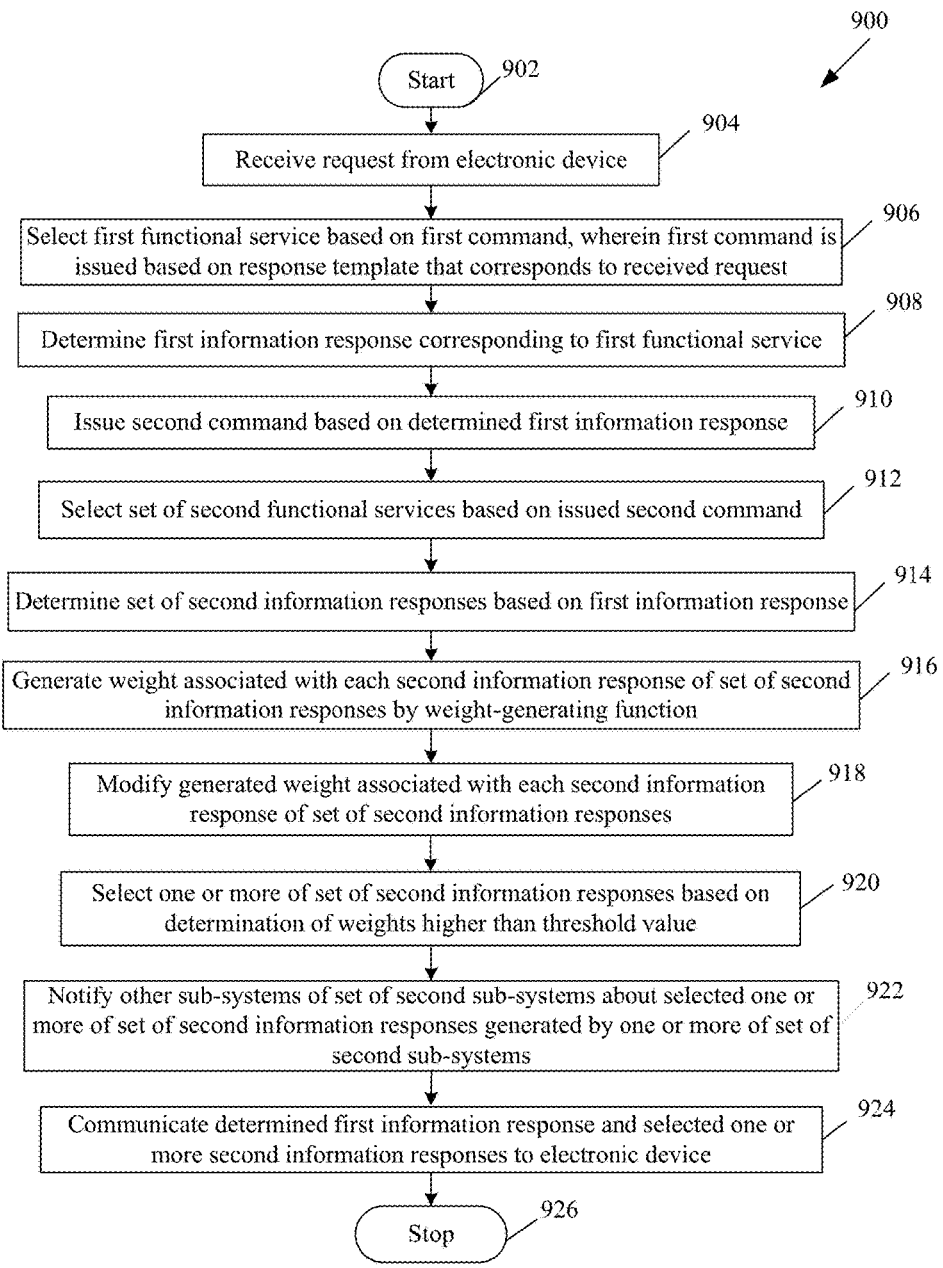
FIG. 9 is a flow chart illustrating another exemplary method for providing information via an intelligent user interface, in accordance with an embodiment of the disclosure.

FIG. 9 is an exemplary flow chart illustrating another method for providing information, in accordance with an embodiment of the disclosure. With reference to FIG. 9, there is shown a flow chart 900. The flow chart 900 is described in conjunction with FIGS. 1, 2, 3, and 4. The method starts at step 902 and proceeds to step 904.

At step 904, a request may be received from the electronic device 102. At step 906, a first functional service may be selected, based on a first command. The first command may be issued based on a response template 406. The response template 406 may correspond to the request received from the electronic device 102. The response template 406 may be based on an artificial intelligence markup language (AIML).

At step 908, in response to the request received from the electronic device 102, a first information response that may correspond to the first functional service may be determined. At step 910, a second command may be issued based on the determined first information response. The second command may initiate determination of a set of second information responses. At step 912, a set of second sub-systems 404 may be selected, based on the issued second command. The set of second sub-systems may provide a set of second functional services. In an embodiment, each sub-system of the set of second sub-systems 404 may be associated with an expert sub-system that may be related to one of the first functional service and the set of second functional services.

At step 914, a set of second information responses may be determined, based on the first information response. Each second information response of the determined set of second information responses may correspond to the set of second functional services. Further, each second information response of the set of second information responses may be associated with a corresponding weight.

At step 916, the weight associated with each second information response of the set of second information responses may be generated. The weight associated with each second information response may be generated by a weight-generating function. At step 918, the generated weight, associated with each second information response of the set of second information responses, may be modified. The modification of the generated weight may be based on historical data of usage pattern, and/or the historical data of events related to each of the determined one or more second information responses.

At step 920, one or more of the set of second information responses may be selected, based on a determination of weights higher than a threshold value. In an embodiment, one or more second information responses may be selected, based on determination of the weight that may be of a maximum value amongst all the generated weights. At step 922, the other sub-systems of the set of second sub-systems may be notified about the selected one or more of the set of second information responses generated by one or more of the set of second sub-systems 404. At step 924, the determined first information response and the selected one or more second information responses may be communicated to the electronic device 102. Control passes to end step 926.

In accordance with an embodiment of the disclosure, a system for providing information is disclosed. A server, such as the server 104 (FIG. 1) may comprise one or more processors (hereinafter referred to as the processor 302 (FIG. 3)). The processor 302 may be operable to determine a first information response that may correspond to a first functional service in response to receiving a request from the electronic device 102 (FIG. 1). The processor 302 may be further operable to determine a set of second information responses based on the first information response. Each second information response of the determined set of second information responses may correspond to a set of second functional services. Further, each second information response of the set of second information responses may be associated with a corresponding weight. One or more of the determined set of second information responses may be selected based on the corresponding weight.

The electronic device 102 may comprise one or more processors (hereinafter referred to as the processor 202 (FIG. 2)). The processor 202 may be operable to communicate a request to the server 104; the request may be indicative of user input via the intelligent UI 114 of the electronic device 102. The processor 202 may be operable to receive a first information response that may correspond to a first functional service, in response to the communicated request. The processor 202 may be operable to receive one or more second information responses that may correspond to a set of second functional services, in response to the communicated request. The processor 202 may be further operable to output the received first information response and the received one or more second information responses, via the intelligent UI 114 of the electronic device 102.

Various embodiments of the disclosure may provide a non-transitory computer readable medium and/or storage medium, and/or a non-transitory machine readable medium and/or storage medium having stored thereon, a machine code and/or a computer program having at least one code section executable by a machine and/or a computer for providing information. The at least one code section in the server 104 may cause the machine and/or computer to perform the steps comprising determining a first information response that may correspond to a first functional service in response to receiving a request from the electronic device 102. Based on the first information response, a set of second information responses may be determined. Each second information response of the determined set of second information responses may correspond to a set of second functional services. Each second information response of the set of second information responses may be associated with a corresponding weight. One or more of the determined set of second information responses may be selected based on the corresponding weight.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method, comprising:
   in a server:
      determining a first information response based on a user request received from an electronic device, wherein said first information response is first information associated with a first functional service of said electronic device;
      determining a set of second information responses based on said first information response, wherein said set of second information responses is second information associated with a set of second functional services of said electronic device;
      generating a corresponding weight associated with each second information response of said determined set of second information responses;
      modifying said corresponding weight associated with each second information response based on historical data of usage pattern related to each second information response of said determined set of second information responses; and
      selecting at least one second information response of said determined set of second information responses based on said modified corresponding weight, wherein said first functional service is different from said set of second functional services.

2. The method of claim 1, wherein said first functional service and said set of second functional services correspond to at least one of an Internet Protocol (IP) telephony system, a space-based satellite navigation system, a social network, a wireless connection system, an address book system, an instant messaging system, a weather forecasting system, a camera-based system, a timer system, a user profile information system, an image processing system, calendaring system, a video playback system, or a sensor-based system.

3. The method of claim 1, further comprising
   issuing a first command based on a response template; and
   selecting said first functional service based on said first command, wherein said response template corresponds to said user request received from said electronic device.

4. The method of claim 3, wherein said response template is based on an artificial intelligence markup language (AIML).

5. The method of claim 4, further comprising:
   issuing a second command based on said determined first information response, wherein said second command is issued by a first sub-system that provides said first functional service; and
   selecting said set of second functional services based on said issued second command, wherein said set of second functional services is provided by a set of second sub-systems.

6. The method of claim 5, wherein each sub-system of said set of second sub-systems is associated with an expert sub-system, wherein said expert sub-system is associated with at least one of said first functional service or said set of second functional services.

7. The method of claim 1, further comprising generating said corresponding weight based on a weight-generating function of a weight master.

8. The method of claim 1, further comprising modifying said generated corresponding weight based on historical data of events related to each second information response of said determined set of second information responses.

9. The method of claim 1, further comprising communicating said determined first information response and said selected at least one second information response of said determined set of second information responses to said electronic device.

10. The method of claim 1, wherein said selection of said at least one second information response of said determined set of second information responses is based on a determination of respective corresponding weights associated with each second information response of said determined set of second information responses that are higher than a threshold value.

11. A method, comprising:
   in an electronic device:
      communicating a request to a server, said request indicative of a user input provided via a User Interface (UI), wherein said user input is rendered on said electronic device;
      receiving, from the server, a first information response corresponding to a first functional service of said electronic device and at least one of second information responses corresponding to a set of second functional services of said electronic device, wherein said first information response and at least one of said second information responses are received based on said communicated request, wherein said first information response is first information associated with said first functional service, and wherein at least one of said second information responses is second information associated with said set of second functional services, wherein a corresponding weight associated with at least one of second information responses is generated based on said communicated request, and wherein at least one of said second information responses is selected based on the corresponding weight modified based on historical data of usage pattern related to at least one of said second information responses; and outputting said received first information response and said received at least one of said second information responses via said UI, wherein said first functional service is different from said set of second functional services.

12. The method of claim 11, wherein said first functional service and said set of second functional services correspond to at least one of an Internet Protocol (IP) telephony system, a space-based satellite navigation system, a social network, a wireless connection system, an address book system, an instant messaging system, a weather forecasting system, a camera-based system, a timer system, a user profile information system, an image processing system, a calendaring system, a video playback system, or a sensor-based system.

13. The method of claim 11, further comprising determining a response template based on said user input, wherein said determined response template corresponds to said request communicated to said server.

14. The method of claim 13, wherein said response template is based on an artificial intelligence markup language (AIML).

15. The method of claim 11, wherein said output of said received first information response and said received at least one of said second information responses is at least one of an audio output generated by at least one speaker of said electronic device, or a visual output on a display screen of said electronic device.

16. A system, comprising:
one or more processors in a server, wherein said one or more processors are configured to:
determine a first information response based on a user request received from an electronic device,
wherein said first information response is first information associated with a first functional service of said electronic device;
determine a set of second information responses based on said first information response,
wherein said set of second information responses is second information associated with a set of second functional services of said electronic device,
generate a corresponding weight associated with each second information response of said determined set of second information responses
modify said corresponding weight associated with each second information response based on historical data of usage pattern related to each second information response of said determined set of second information responses; and
select at least one second information response of said determined set of second information responses based on said modified corresponding weight,
wherein said first functional service is different from said set of second functional services.

17. The system of claim 16, wherein said first functional service and said set of second functional services correspond to at least one of an Internet Protocol (IP) telephony system, a space-based satellite navigation system, a social network, a wireless connection system, an address book system, an instant messaging system, a weather forecasting system, a camera-based system, a timer system, a user profile information system, an image processing system, a calendaring system, a video playback system, or a sensor-based system.

18. The system of claim 16, wherein said one or more processors are further configured to:
issue a first command based on a response template; and
select said first functional service based on said first command, wherein said response template corresponds to said user request received from said electronic device.

19. The system of claim 18, wherein said response template is based on an artificial intelligence markup language (AIML).

20. The system of claim 19, wherein said one or more processors are further configured to:
issue a second command based on said determined first information response, wherein said second command is issued by a first sub-system that provides said first functional service; and
select said set of second functional services based on said issued second command, wherein said set of second functional services is provided by a set of second sub-systems.

21. The system of claim 20, wherein each sub-system of said set of second sub-systems is associated with an expert sub-system, wherein said expert sub-system is associated with at least one of said first functional service or said set of second functional services.

22. The system of claim 16, wherein said corresponding weight is generated based on a weight-generating function of a weight master.

23. The system of claim 16, wherein said one or more processors are further configured to modify said generated corresponding weight based on historical data of events related to each second information response of said determined set of second information responses.

24. The system of claim 16, wherein said one or more processors are further configured to communicate said determined first information response and said selected at least one second information response of said determined set of second information responses to said electronic device.

25. The system of claim 16, wherein said selection of at least one second information response of said determined set of second information responses is based on determination of respective corresponding weights associated with each second information response of said determined set of second information responses that are higher than a threshold value.

26. A non-transitory computer-readable medium having stored thereon, computer-executable instructions which when executed by a computer cause the computer to execute operations, the operations comprising:
in a server:
determining a first information response based on a user request received from an electronic device,
wherein said first information response is first information associated with a first functional service of said electronic device;
determining a set of second information responses based on said first information response, wherein said set of second information responses is second information associated with a set of second functional services of said electronic device, and generating a corresponding weight associated with each second information response of said determined set of second information responses modifying said corresponding weight associated with each second information response based on historical data of usage pattern related to each second information response of said determined set of second information responses; and selecting at least one second information response of said determined set of second information responses based on said modified corresponding weight, wherein said first functional service is different from said set of second functional services.

* * * * *